(12) United States Patent
Ogura et al.

(10) Patent No.: US 7,539,097 B2
(45) Date of Patent: May 26, 2009

(54) OPTICAL DISK DEVICE

(75) Inventors: Youichi Ogura, Osaka (JP); Toshihiko Takahashi, Osaka (JP); Teruhiko Izumi, Osaka (JP); Shinichi Konishi, Nara (JP); Hironori Deguchi, Osaka (JP); Takamasa Sakai, Osaka (JP)

(73) Assignee: Panasonic Corporation, Osaka (JP)

( * ) Notice: Subject to any disclaimer, the term of this patent is extended or adjusted under 35 U.S.C. 154(b) by 561 days.

(21) Appl. No.: 11/234,212

(22) Filed: Sep. 26, 2005

(65) Prior Publication Data

US 2006/0077828 A1    Apr. 13, 2006

(30) Foreign Application Priority Data

Sep. 27, 2004    (JP)    ............... 2004-280109

(51) Int. Cl.
G11B 20/00    (2006.01)

(52) U.S. Cl. .................... 369/47.19; 369/59.19

(58) Field of Classification Search ............. 369/47.19, 369/59.19, 47.18, 47.22, 47.4, 59.16, 59.18
See application file for complete search history.

(56) References Cited

U.S. PATENT DOCUMENTS

| | | | |
|---|---|---|---|
| 6,381,201 B1 * | 4/2002 | Shihara et al. ........... | 369/32.01 |
| 6,538,966 B1 * | 3/2003 | Hanks .................... | 369/47.28 |
| 6,671,244 B2 * | 12/2003 | Honma .................... | 369/59.22 |
| 6,735,160 B1 * | 5/2004 | Miyashita et al. ......... | 369/59.12 |
| 6,958,958 B2 * | 10/2005 | Iimura .................... | 369/47.22 |
| 6,963,521 B2 * | 11/2005 | Hayashi .................. | 369/44.13 |
| 2001/0006500 A1 * | 7/2001 | Nakajima et al. ......... | 369/47.35 |
| 2002/0057639 A1 * | 5/2002 | Shiizaki et al. .......... | 369/53.35 |
| 2003/0072231 A1 * | 4/2003 | Matsui .................... | 369/47.22 |

FOREIGN PATENT DOCUMENTS

| | | |
|---|---|---|
| JP | 2000-200417 | 7/2000 |
| JP | 2001-243714 | 9/2001 |

* cited by examiner

Primary Examiner—Andrea L Wellington
Assistant Examiner—Aneeta Patankar
(74) Attorney, Agent, or Firm—Wenderoth, Lind & Ponack, L.L.P.

(57) ABSTRACT

An optical disk device is provided with a first analog-to-digital converter for converting a push-pull signal detected from an optical disc medium into a digital sampling signal according to a sampling clock in the vicinity of a channel frequency. The optical disk device also includes an address polarity information detection circuit for detecting address polarity information from the digital sampling signal, and an address position information detection circuit for detecting address position information from the digital sampling signal while maintaining continuity.

19 Claims, 19 Drawing Sheets

Fig.6

| Header1 | | | | | Header2 | | | | | | Header3 | | | | | Header4 | | | |
|---|---|---|---|---|---|---|---|---|---|---|---|---|---|---|---|---|---|---|---|
| VFO1 | AM | PID1 | IED1 | PA1 | VFO2 | AM | PID2 | IED2 | PA2 | VFO1 | AM | PID3 | IED3 | PA1 | VFO2 | AM | PID4 | IED4 | PA2 |
| 36 | 3 | 4 | 2 | 1 | 8 | 3 | 4 | 2 | 1 | 36 | 3 | 4 | 2 | 1 | 8 | 3 | 4 | 2 | 1 |

OPTICAL DISK DEVICE

BACKGROUND OF THE INVENTION

1. Field of the Invention

The present invention relates to an optical disk device for performing recording and reproduction of digital data in/from an optical storage medium. More particularly, the present invention relates to techniques for recording and reproduction of digital data in/from a DVD-RAM (Digital Versatile Disk-Random Access Memory) or the like in which CAPA (Complementary Allocated Pit Addressing) exists, and for playback of an optical storage medium in which BCA (Burst Cutting Area) information exists.

2. Description of the Related Art

As a method for recording digital data on optical disk media as information storage media, there has commonly been employed a method of uniformizing the recording density on a storage medium by making the linear velocity constant, as seen in a compact disk (registered trademark; hereinafter referred to as a CD) and a digital versatile disk (hereinafter referred to as a DVD). In recent years, there have been employed as such storage media, not only a read-only optical disk, but also a writable DVD-Random Access Memory (hereinafter referred to as DVD-RAM), a write-once DVD-Recordable (hereinafter referred to as DVD-R), and a DVD-Rewritable (hereinafter referred to as DVD-RW). Among these media, the DVD-RAM disk is characterized by that it enables recording and reproduction of data by random access, and therefore, it is suitable as an information storage medium in a DVD recorder.

On a DVD-RAM disk, address information (Complementary Allocated Pit Addressing; hereinafter referred to as CAPA) has previously been recorded in an embossed area as shown in FIG. 21(a), and a capability of detecting the address information is one of factors that determine random access performance and recording/playback performance.

Hereinafter, a description will be given of an address detection unit included in a conventional DVD-PAM disk recording/playback apparatus.

FIG. 19 is a diagram illustrating an address detection unit for a conventional DVD-RAM disk, which is disclosed in Japanese Published Patent Application No. 2001-243714. This address detection unit performs address detection according to an analog signal processing method.

With reference to FIG. 19, an optical disk medium 1 is an optical storage medium having a thin film made of a phase change recording material, on which tracks are spirally or concentrically formed at regular intervals. A rewritable DVD-RAM disk as an example of the optical disk medium 1 has address information (CAPA) which is intermittently formed in an embossed area. A spindle motor 107 rotates the optical disk medium 1 at a predetermined linear velocity, and it is composed of a spindle motor, a stepping motor, and the like.

An optical pickup 3 writes and reads data into/from the optical disk medium 1. As shown in FIG. 2, the optical pickup 3 comprises an actuator on which a laser generation circuit 4 for focusing a light spot and scanning tracks is mounted, a four-split photodetector 5 for detecting a tracking error signal, which converts reflected light from the light spot into an electric signal, and a two-split photodetector 6 for detecting a focus error signal using two photodetectors 6a and 6b for short range and long range, respectively. The four-split photodetector 5 is divided into four regions 5a to 5d by a track direction axis and an axis perpendicular to the track direction axis.

As shown in FIG. 19, I/V converters 7 to 10 are current-to-voltage converters for converting detected currents outputted from the four photodetectors 5a to 5d into voltages, and I/V converters 77 and 78 are current-to-voltage converters for converting detected currents outputted from the two photodetectors 6a and 6b into voltages. An adder 11 adds the output voltages from the I/V converters 7 and 10, and an adder 12 adds the output voltages from the I/V converters 8 and 9. A balance adjuster 108 adjusts the balance between the output signals of the adders 11 and 12. A differential amplifier 109 generates a push-pull signal 14 on the basis of the output of the balance adjuster 108. A tracking error generator 110 generates a tracking error signal 17 from the push-pull signal 14. An equalizer 116 performs waveform equalization for the push-pull signal 14, and an address detector 117 detects address position information 41 and address polarity information 42 and 118 from the output signal of the equalizer 116. A wobble detector 115 detects a wobble signal that is caved along the tracks on the optical disk medium 1, binarizes the wobble signal, and outputs the binarized signal to an optical disk controller 16.

An adder 111 fully adds the output signals from the I/V converters 77 and 78 and the output signals from the adders 11 and 12 to generate a reproduction RF (Radio Frequency) signal 87. An AGC (Auto Gain Control) circuit 112 performs amplitude control for the reproduction RF signal 87, and an equalizer 81 equalizes the output waveform of the AGC circuit 112. An off-set cancel, unit 113 cancels oft-set components of the output signal from the equalizer 81, and a data slice circuit 114 binarizes the output signal from the off-set cancel unit 113. An optical disk controller 16 controls focus servo and tracking servo according to a tracking error signal 17 and a focus error signal.

Hereinafter, a description will be given of the operation of the address detection apparatus constituted as described above.

A laser beam emitted from the laser generation circuit 4 of the optical pickup 3 is reflected at the optical disk medium 1, and the reflected light beam is received by the divided regions 5a to 5d of the four-split photodetector 5. The four-split photodetector 5 outputs detection currents according to the amounts of light received by the respective divided regions, and the detection currents are converted into voltage values by the I/V converters 7 to 10. The output voltages from the I/V converters 7 and 10 are added by the adder 11 while the output voltages from the I/V converters 8 and 9 are added by the adder 12, and thereafter, these voltages are subjected to balance adjustment by the balance adjuster 108. The differential amplifier 109 detects a difference between the output of the adder 11 and the output of the adder 12, thereby generating a push-pull signal 14 as shown in FIG. 21(b) to be output to the tracking error generator 110, the equalizer 116, and the wobble detector 115.

High frequency components of the push-pull signal 14 outputted from the tracking error generator 110 are removed, whereby the push-pull signal 14 is converted into a tracking error signal 17. The wobble detector 115 detects a wobble signal that is carved along the tracks on the optical disk medium 1 and binarizes the signal, and outputs the binarized signal to the optical disk controller 16. The push-pull signal 14 outputted to the equalizer 116 is subjected to waveform equalization, and then inputted to the address detector 117, whereby address position information 41, address polarity information 42, and address polarity information 118 are detected. Hereinafter, the detail of the address detector 117 will be described with reference to FIGS. 20 and 21. FIG. 20 is a block diagram illustrating the construction of the address detector 117.

As shown in FIG. 20, the address detector 117 comprises comparators 119 and 120, an OR circuit 121, retriggerable monostable multi-vibrators 122 and 123, a charge pump 124, a capacitor 125, and a gate processing function 126.

The push-pull signal 14 shaped by the equalizer 116 is inputted to the comparators 119 and 120, and binarized with a predetermined threshold, and thereafter, inputted to the retriggerable monomulti vibrators 122 and 123 and to the OR circuit 121.

The outputs of the comparators 119 and 120 are logically added (hereinafter referred to simply as "added") to each other by the OR circuit 121, and inputted as an address binarization pulse to the charge pump 124.

The charge pump 124 contains an analog switch and a current supply, and the address binarization pulse outputted from the OR circuit 121 is inputted to the charge pump 124. The charge pump 124 is constructed so that a charging current flows into the capacitor 125 during an "H" period of the address binarization pulse while a discharging current flows from the capacitor 125 during an "L" period of the address binarization pulse, when the CAPA area signal 25 is "H" and the analog switch is on. With this construction of the charge pump, charging and discharging of the capacitor 125 is carried out only during a period of header field (CAPA), whereby a threshold value 127 of the comparator 119 and a threshold value 128 of the comparator 120 are respectively fed back by the gate processing function 126 so that the pulse duty of the address binarization pulse that is gated by the CAPA area signal 25 is set to 50%, thereby generating an accurate binarization pulse.

Retriggerable monostable multi-vibrators (hereinafter referred to as retriggerable monomulti vibrators) 122 and 123 receive the output signals of the comparators 119 and 120, respectively, and output pulses during an appropriate period of time. Further, when the retriggerable monomulti vibrator receives a trigger input while it outputs the pulse, it outputs a pulse again from the point in time. The output signal of the retriggerable monomulti vibrator 122 is address polarity information 42 indicating an upper address as shown in FIG. 21(c), and the output signal of the retriggerable monomulti vibrator 123 is address polarity information 118 indicating a lower address as shown in FIG. 21(d). Address position information 41 showing a CAPA area is obtained as a signal shown in FIG. 21(e) by adding (OR addition) the address polarity information 42 and the address polarity information 118.

According to the above-mentioned operation, the address position information 41, the address polarity information 42, and the address polarity information 118 are detected by the address detector 117 on the basis of the output signals from the four-split photodetector 5.

On the other hand, the two detection currents outputted from the two-split photodetectors 6a and 6b are converted into voltage values by the I/V converters 77 and 78, respectively, and outputted to the adder 111. The adder 111 adds the output signals of the I/V converters 77 and 78 and the output signals of the adders 11 and 12, thereby generating a reproduction RF signal 87 in which all of the optical signals received by the four-split photodetector 5 and the two-split photodetector 6 are added.

The reproduction RF signal 87 is subjected to amplitude control by the AGC circuit 112, and thereafter, the waveform of the RF signal 87 is shaped so as to be easily binarized, and then the shaped signal is converted into a digital binarized signal 105 by the data slice circuit 114 via the offset cancel circuit 113. The digital binarized signal 105 is outputted to the optical disk controller 16.

The optical disk controller 16 drives the optical pickup 3 via a traverse drive circuit 130 and an actuator drive circuit 131 according to a tracking error signal 17 and a focus error signal, thereby performing focus servo and tracking servo. Further, the optical disk controller 16 performs demodulation of the recorded digital data using the digital binarized signal 105. At this time, the optical disk controller 16 generates a CAPA area signal 118 indicating a correct address area, performs tracking control so as to switch the track between a land track and a groove track alternately for every cycle, using the obtained address information, the address position information 41, the address polarity information 42, and the address polarity information 118, thereby alternately reproducing an address area and a digital data recorded area. Further, the optical disk controller 16 drives the spindle motor 107 via the spindle motor control circuit 132 on the basis of clock component information of the digital binarized signal 105.

In the conventional construction, however, when detecting the address position information and the address polarity information in the CAPA, since the front-side CAPA (hereinafter referred to as front CAPA) and the rear-side CAPA (hereinafter referred to as rear CAPA) which exist in the optical difference signal are separately detected, it is highly possible that continuity is lost in the vicinity of the middle of the address position information. This causes degradation in the address information detection accuracy, resulting in a reduction in the recording/reproduction performance of the optical disk device.

Further, in the above-mentioned conventional address detection apparatus, the analog filter for detecting the address position information and the address polarity information is required to change the filter multiplier for every recording/reproduction speed, resulting in increased circuit scale and increased power consumption.

Furthermore, when performing BCA (Burst Cutting Area) detection from an optical recording medium having a BCA in which information of the medium is described, the conventional construction cannot perform BCA detection.

SUMMARY OF THE INVENTION

The present invention is made to solve the above-mentioned problems and has for its object to provide an optical disk device having high recording/reproduction performance, which accurately detects address position information and address polarity information from CAPA.

Further, it is another object of the present invention to provide an optical disk device which can realize a reduction in circuit scale and a reduction in power consumption during high-speed recording and playback by extending an application area of a digital signal processing circuit, using a semiconductor integrated circuit.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an optical disk device comprising: a first photodetector for detecting a light signal which is divided into four parts by a track direction axis and a radial direction axis that is perpendicular to the track direction axis, from an optical recording medium on which address information exists intermittently in an embossed area; an optical difference signal detection circuit for adding, among the outputs from the first photodetector which have been current-to-voltage converted, the outputs corresponding to areas parallel to the track direction axis, and detecting a difference between the respective added values; an amplitude adjustment circuit for adjusting the amplitude of an output signal of the optical difference signal detection circuit; a clock generation circuit for generating, from the output signal of the optical difference signal detection circuit, a sampling clock having a frequency that is synchronized with digital data recorded on the optical recording medium; a first analog-to-digital converter for converting an output signal of the amplitude adjustment circuit into a digital sampling signal according to the sampling clock; an address polarity information detection circuit for detecting a peak envelope signal from the digital sampling signal, and comparing the peak envelope signal with a predetermined threshold value, thereby detecting address polarity information; and an address position information detection circuit for detecting a bottom envelope signal from the digital sampling signal, detecting signal amplitude information from a difference in amplitudes between the peak envelope signal and the bottom envelope signal, and comparing the signal amplitude information with a predetermined threshold value, thereby detecting address position information.

According to a second aspect of the present invention, in the optical disk device according to the first aspect, the address polarity information detection circuit comprises: a zone peak detection circuit for detecting the amount of peak in an arbitrary zone, from the digital sampling signal; a first high-pass noise removal circuit for removing a high-pass noise component from an output signal of the zone peak detection circuit to detect the peak envelope signal; a first low-pass variation component extraction circuit for extracting a low-pass variation component from an output signal of the first high-pass noise removal circuit; a first threshold detection circuit for adding an arbitrary offset level to an output signal of the first low-pass variation component extraction circuit; and a signal polarity determination circuit for comparing the output signal of the first high-pass noise removal circuit with the output signal of the first threshold detection circuit to generate the address polarity information; and the address position information detection circuit comprises: a zone bottom detection circuit for detecting the amount of bottom in an arbitrary zone, from the digital sampling signal; a second high-pass noise removal circuit for removing a high-pass noise component from an output signal of the zone bottom detection circuit to detect the bottom envelope signal; a second low-pass variation component extraction circuit for extracting a low-pass variation component from an output signal of the second high-pass noise removal circuit; a signal amplitude detection circuit for detecting the signal amplitude information from a difference between the output signal of the first high-pass noise removal circuit and the output signal of the second high-pass noise removal circuit; an amplitude low-pass variation detection circuit for extracting the amplitude low-pass variation component information from a difference between the output signal of the first low-pass variation component extraction circuit and the output signal of the second low-pass variation component extraction circuit; a second threshold detection circuit for adding an arbitrary offset level to an output: signal of the amplitude low-pass variation detection circuit; and an address position detection circuit for comparing the output signal of the signal amplitude detection circuit with the output signal of the second threshold detection circuit to generate the address position information.

According to a third aspect of the present invention, in the optical disk device according to the first aspect, the clock generation circuit comprises: a wobble detection circuit for detecting a wobble pattern that is carved in tracks on the optical recording medium to obtain a wobble signal; a wobble binarization circuit for converting the wobble signal into binarized data; a frequency sync loop circuit for performing control so that the sampling clock is synchronized with a frequency corresponding to a channel bit of the digital data recorded on the optical recording medium, or an arbitrary frequency that is N times (N: positive integer) as high as the frequency corresponding to the channel bit of the digital data; a voltage-controlled oscillator for varying a clock to be output, according to an output signal of the frequency sync loop circuit; and a clock division circuit for arbitrarily dividing the clock outputted from the voltage-controlled oscillator into M (M: positive integer); wherein the frequency sync loop circuit controls the clock outputted from the voltage-controlled oscillator so that the clock is synchronized with the frequency corresponding to the channel bit of the digital data recorded on the optical recording medium, or the arbitrary frequency that is N times (N: positive integer) as high as the frequency corresponding to the channel bit of the digital data, on the basis of the cycle of the output signal from the wobble binarization circuit.

According to a fourth aspect of the present invention, the optical disk device according to the second aspect further includes a missing data interpolation circuit for interpolating the digital sampling signal, wherein the zone peak detection circuit compares the sampling signal with an output signal of the missing data interpolation circuit to detect the amount of peak in an arbitrary zone, and the zone bottom detection circuit compares the sampling signal with the output signal of the missing data interpolation circuit to detect the amount of bottom in an arbitrary zone.

According to a fifth aspect of the present invention, in the optical disk device according to the second aspect, the signal polarity determination circuit includes a spike removal circuit for removing spike pulses that deteriorate the continuity of the address polarity information, and a polarity signal mask circuit for enabling the address polarity information in a position where presence of the address information is estimated.

According to a sixth aspect of the present invention, in the optical disk device according to the second aspect, the address position detection circuit includes a spike removal circuit for removing spike pulses that deteriorate the continuity of the address position information, and an address position information mask circuit for enabling the address position information in a position where presence of the address information is estimated.

According to a seventh aspect of the present invention, in the optical disk device according to the second aspect, the second low-pass variation component extraction circuit extracts a low-pass variation component from the output signal of the signal amplitude detection circuit, and the second threshold value detection circuit adds an arbitrary offset level to the output signal of the second low-pass variation component extraction circuit.

According to an eighth aspect of the present invention, the optical disk device according to the seventh aspect further includes: an offset variation detection circuit for detecting center points of the output signal from the first high-pass noise removal circuit and the output signal from the high-pass noise removal circuit; the first low-pass variation component extraction circuit receiving the output signal of the offset variation detection circuit instead of the output signal of the signal amplitude detection circuit; a first envelope detection circuit for detecting an absolute value of a difference between the output signal of the first low-pass variation component extraction circuit and the output signal of the first high-pass noise removal circuit; a second envelope detection circuit for detecting an absolute value of a difference between the output signal of the first low-pass variation component extraction circuit and the output signal of the second high-pass noise removal circuit; an addition circuit for adding the output signal of the first envelope detection circuit and the output signal of the second envelope detection circuit; and the second low-pass variation component extraction circuit extracting a low-pass variation component from the output signal of the addition circuit instead of the output signal of the signal amplitude detection circuit.

According to a ninth aspect of the present invention, there is provided an optical disk device comprising: a first photodetector for detecting a light signal which is divided into four parts by a track direction axis and a radial direction axis that is perpendicular to the track direction axis, from an optical recording medium on which address information exists intermittently in an embossed area or an optical recording medium on which a burst cutting area wherein information of the medium is described exists; an optical difference signal detection circuit for adding, among the outputs of the first photodetector which have been current-to-voltage converted, the outputs corresponding to areas parallel to the track direction axis, and detecting a difference between the respective added values; an amplitude adjustment circuit for adjusting the amplitude of an output signal of the optical difference signal detection circuit; a clock generation circuit for generating, from the output signal of the optical difference signal detection circuit, a sampling clock having a frequency that is synchronized with (digital data recorded on the optical recording medium; a first analog-to-digital converter for converting an output signal of the amplitude adjustment circuit into a digital sampling signal according to the sampling clock; a second photodetector for detecting a focus error signal; a reproduction signal detection circuit for detecting a reproduction RF (Radio Frequency) signal using, among the outputs from the first photodetector which have been current-to-voltage converted, the outputs corresponding to the areas parallel to the track direction axis which have been added, and the output from the second photodetector which has been current-to-voltage converted; a reproduction signal amplitude adjustment circuit for performing amplitude adjustment of the output signal from the reproduction signal detection circuit; an equalizer emphasizing a high-pass component of the output signal from the reproduction signal amplitude adjustment circuit; a second analog-to-digital converter for converting the output signal of the equalizer into a digital RF signal according to the sampling clock generated from the clock generation circuit; a reproduction signal selection circuit for selecting one of the digital sampling signal outputted from the first analog-to-digital converter and the digital RF signal; an address polarity information detection circuit for detecting a peak envelope signal from the output signal of the reproduction signal selection circuit, and comparing the peak envelope signal with a predetermined threshold value, thereby detecting address polarity information, or BCA (Burst Cutting Area) information recorded in the burst cutting area; and an address position information detection circuit for detecting a bottom envelope signal from the output signal of the reproduction signal selection circuit, detecting signal amplitude information from a difference in amplitudes between the peak envelope signal and the bottom envelope signal, and comparing the signal amplitude information with a predetermined threshold value, thereby detecting address position information.

According to a tenth aspect of the present invention, in the optical disk device according to the ninth aspect, the address polarity information detection circuit includes: a zone peak detection circuit for detecting the amount of peak in an arbitrary zone, from the output of the reproduction signal selection circuit; a first high-pass noise removal circuit for removing a high-pass noise component from the output signal of the zone peak detection circuit to detect the peak envelope signal; a first low-pass variation component extraction circuit for extracting a low-pass variation component from an output signal of the first high-pass noise removal circuit; a first threshold detection circuit for adding an arbitrary offset level to an output signal of the first low-pass variation component extraction circuit; and a signal polarity determination circuit for comparing the output signal of the first high-pass noise removal circuit with the output signal of the first threshold detection circuit, to generate the address polarity information; and the address position information detection circuit includes: a zone bottom detection circuit for detecting the amount or bottom in an arbitrary zone, from the output signal of the reproduction signal selection circuit; a second high-pass noise removal circuit for removing a high-pass noise component from an output signal of the zone bottom detection circuit to detect the bottom envelope signal; a second low-pass variation component extraction circuit for extracting a low-pass variation component from an output signal of the second high-pass noise removal circuit; a signal amplitude detection circuit for detecting the signal amplitude information from a difference between the output signal of the first high-pass noise removal circuit and the output signal of the second high-pass noise removal circuit; an amplitude low-pass variation detection circuit for extracting the amplitude low-pass variation component information from a difference between the output signal of the first low-pass variation component extraction circuit and the output signal of the second low-pass variation component extraction circuit; a second threshold detection circuit for adding an arbitrary offset level to an output signal of the amplitude low-pass variation detection circuit; and an address position detection circuit for comparing the output signal of the signal amplitude detection circuit with the output signal of the second threshold detection circuit to generate the address position information.

According to an eleventh aspect of the present invention, in the optical disk device according to the ninth aspect, the clock generation circuit comprises: a wobble detection circuit for detecting a wobble pattern that is carved in tracks formed on the optical recording medium to obtain a wobble signal; a wobble binarization circuit for converting an output of the wobble detection circuit into binarized data; a frequency sync loop circuit for performing control so that the sampling clock is synchronized with a frequency corresponding to a channel bit of the digital data recorded on the optical recording medium, or an arbitrary frequency that is N times (N: positive integer) as high as the frequency corresponding to the channel bit of the digital data; a voltage-controlled oscillator for varying a clock to be output, according to an output signal of the frequency sync loop circuit; and a clock division circuit for arbitrarily dividing the clock outputted from the voltage-controlled oscillator into M (M: positive integer); wherein the frequency sync loop circuit controls the clock outputted from the voltage-controlled oscillator so that the clock is synchronized with the frequency corresponding to the channel bit of the digital data recorded on the optical recording medium, or the arbitrary frequency that is N times (N: positive integer) as high as the frequency corresponding to the channel bit of the digital data, on the basis of the cycle of the output signal from the wobble binarization circuit.

According to a twelfth aspect of the present invention, in the optical disk device according to the ninth aspect, the address polarity information detection circuit detects address polarity information when the reproduction signal selection circuit selects the digital sampling signal, and detects the BCA information when the reproduction signal selection circuit selects the digital RF signal.

According to a thirteenth aspect of the present invention, the optical disk device according to the tenth aspect further includes a missing data interpolation circuit for interpolating the digital sampling signal, wherein the zone peak detection circuit compares the sampling signal with an output signal of the missing data interpolation circuit to detect the amount of peak in an arbitrary zone, and the zone bottom detection circuit compares the sampling signal with the output signal of the missing data interpolation circuit to detect the amount of bottom in an arbitrary zone.

According to a fourteenth aspect of the present invention, in the optical disk device according to the tenth aspect, the signal polarity determination circuit includes a spike removal circuit for removing spike pulses that deteriorate the continuity of the address polarity information, and a polarity signal mask circuit for enabling the address polarity information at a position where presence of the address information is estimated.

According to a fifteenth aspect of the present invention, in the optical disk device according to the tenth aspect, the address position detection circuit includes a spike removal circuit for removing spike pulses that deteriorate the continuity of the address position information, and an address position information mask circuit for enabling the address position information at a position where presence of the address information is estimated.

According to a sixteenth aspect of the present invention, in the optical disk device according to the tenth aspect, the second low-pass variation component extraction circuit extracts a low-pass variation component from the output signal of the signal amplitude detection circuit, and the second threshold value detection circuit adds an arbitrary offset level to the output signal of the second low-pass variation component extraction circuit.

According to a seventeenth aspect of the present invention, in the optical disk device according to the tenth aspect, the reproduction signal selection circuit is provided with a reproduction signal polarity inversion circuit for inverting the positive/negative polarity of an output signal thereof, and the signal polarity determination circuit is provided with a polarity signal inversion circuit for inverting the polarity of a binarized signal as an output signal thereof.

According to an eighteenth aspect of the present invention, in the optical disk device according to the seventeenth aspect, when detecting the BCA information from a writable optical recording medium, the reproduction signal polarity inversion circuit inverts and outputs the digital RF signal so that a dark side of reflected light of the light spot becomes an upper side of the output signal of the reproduction signal selection circuit.

According to a nineteenth aspect of the present invention, in the optical disk device according to the seventeenth aspect, when detecting the BCA information from a read-only optical recording medium, the reproduction signal polarity inversion circuit outputs the digital RF signal without inverting it so that a bright side of reflected light of the light spot becomes an upper side of the output signal of the reproduction signal selection circuit.

According to a twentieth aspect of the present invention, in the optical disk device according to the eleventh aspect, the clock generation circuit has a frequency fixation setting circuit for generating a clock in the vicinity of a channel bit frequency which is calculated from the number of rotations controlled by the optical recording medium rotation circuit.

According to a twenty-first aspect of the present invention, in the optical disk device according to the twentieth aspect, the clock generation circuit further includes a phase sync control circuit for extracting phase error information from the digital RF signal, and synchronizing the sampling clock with the phase of the clock component included in the digital data recorded on the optical recording medium, and controls the clock to be outputted from the voltage-controlled oscillator according to the output signal of the frequency sync loop circuit end the output signal of the phase sync control circuit.

According to a twenty-second aspect of the present invention, the optical disk device according to the ninth aspect further includes a gain learning circuit for setting a gain for adaptively performing amplitude adjustment of the reproduction signal amplitude adjustment circuit, on the basis of the digital RF signal.

According to a twenty-third aspect of the present invention, in the optical disk device according to the twenty-second aspect, the gain learning circuit adjusts the gain of the reproduction signal amplitude address so as to zero a difference between an amplitude value which is obtained from all amplitude difference between the peak envelope and the bottom envelope of the digital RF signal, and a target amplitude which is arbitrarily set.

According to a twenty-fourth aspect of the present invention, the optical disk device according to the ninth aspect further includes an offset cancel circuit for extracting an offset in the amplitude direction from the digital RF signal, and detecting the offset from the digital RF signal to output the digital RF signal, and a data demodulation circuit for binarizing the signal outputted from the offset cancel circuit.

According to a twenty-fifth aspect of the present, invention, the optical disk device according to the first aspect further includes: an optical recording medium rotation control circuit for controlling rotation of the optical recording medium; a laser generation circuit for irradiating the optical recording medium with laser light; an optical pickup having a first photodetector and a second photodetector; an optical pickup drive circuit for controlling the operation of the optical pickup; a high-pass removal filter for removing a high-pass component from the output signal of the optical difference signal detection circuit to obtain a tracking error signal; and an optical disk controller for controlling the optical recording medium rotation control circuit and the optical pickup drive circuit, using the tracking error signal, the address polarity information, the address position information, and the sampling clock.

According to the first to eighth aspects of the present invention, when detecting address position information from an optical recording medium in which address information exists intermittently in an embossed area, a push-pull signal is digitized with a clock synchronized with a channel bit of the optical recording medium, and address position information is detected on the basis of a difference in signal amplitudes of envelope signals after removal of high-pass noise components at a peak side and a bottom side of the digital signal. Therefore, continuity of the address position information is assured, whereby the address information can be detected with accuracy, and recording/reproduction performance of the optical disk device can be improved. Further, since greater part of the address detecting function can be implemented by a digital signal processing circuit, it is possible to achieve reduced circuit scale, low cost, and low power consumption when implementing the function by a semiconductor integrated circuit.

Furthermore, according to the ninth to twenty-fourth aspects of the present invention, when detecting address position information from an optical recording medium in which address information exists intermittently in an embossed area of an optical recording medium in which BCA that describes information of the medium exists, a push-pull signal is digitized with a clock synchronized with a channel bit of the optical recording medium, and address position information is detected on the basis of a difference in signal amplitudes of envelope signals after removal of high-pass noise components at a peak side and a bottom side of the digital signal. Therefore, continuity of the address position information is assured, whereby the address information can be detected with accuracy, and recording/reproduction performance of the optical disk device can be improved. Further, since greater part of the address detecting functional call be implemented by a digital signal processing circuit, it is possible to achieve reduced circuit scale and low power consumption when implementing the function by a semiconductor integrated circuit. Moreover, after converting a reproduction RF signal into a digital RF signal by an analog-to-digital converter, BCA information which describes information of the optical recording medium is detected from the digital RF signal in a circuit for detecting address polarity information. Therefore, it is not necessary to provide a special circuit for BCA information detection, resulting in reduced circuit scale.

Furthermore, according to the twenty-fifth aspect of the present invention, a push-pull signal is digitized with a clock synchronized with a channel bit of the optical recording medium, and address position information is detected on the basis of a difference in signal amplitudes of envelope signals after removal of high-pass noise components at a peak side and a bottom side of the digital signal. Therefore, even when the quality of the read signal is very poor or even just after seeking, detection of address information can be carried out at high speed. Further, it is possible to realize a high-quality and high-performance optical disk device which increases detection accuracy of address information even during recording and playback, and which is independent of the quality of the optical recording medium and characteristics of an optical pickup. Moreover, after converting a reproduction RF signal into a digital RF signal by an analog-to-digital converter, the digital RF signal is input to a circuit for detecting address polarity information, thereby to detect BCA information. Therefore, the address information detecting function and the BCA information detecting function can share a single detection circuit, whereby reductions in cost and circuit scale can be realized in an optical disk device which needs to support recording or playback of a DVD-RAM disk.

BRIEF DESCRIPTION OF THE DRAWINGS

FIG. 6 is a diagram for explaining a format of CAPA on a DVD-RAM disk.

DETAILED DESCRIPTION OF THE INVENTION

Hereinafter, embodiments of the present invention will be described with reference to the drawings.

Embodiment 1

A first embodiment of the present invention corresponds to when detecting address polarity information indicating a relationship between a front CAPA and a rear CAPA and address position information indicating a CAPA area during recording/playback of a DVD-RAM as a writable optical disk, a push-pull signal as an optical difference signal is converted into a digital sampling signal using a sampling clock that is generated on the basis of cycle information extracted from a wobble signal carved along tracks on the optical disk. Moreover, address detection is carried out with high accuracy using a digital filter and a digital signal processing circuit, thereby to improve recording/playback performance of the DVD-RAM.

Figure 1:
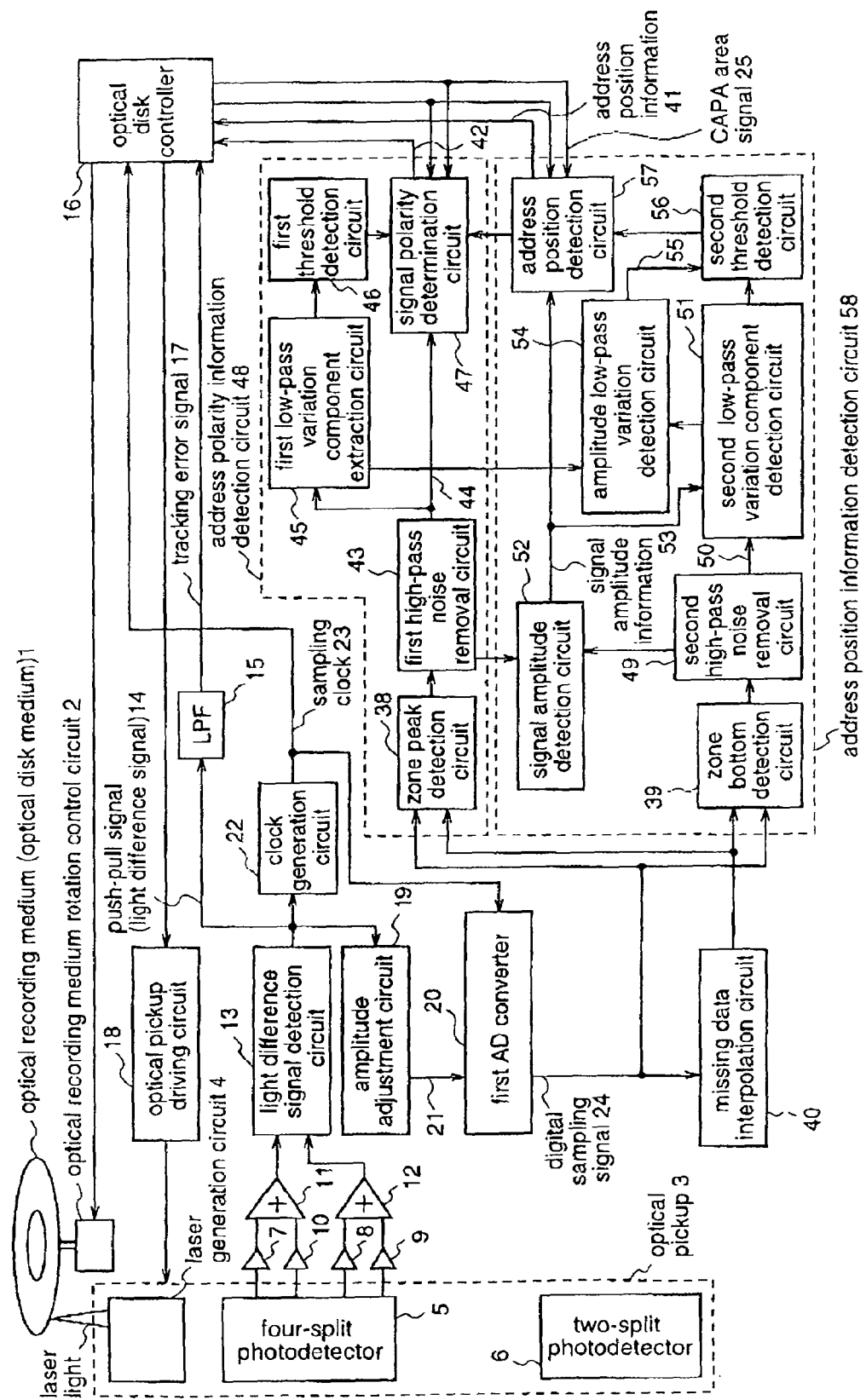
FIG. 1 is a block diagram illustrating the construction of an optical disk device according to a first embodiment of the present invention.
Figure 2:
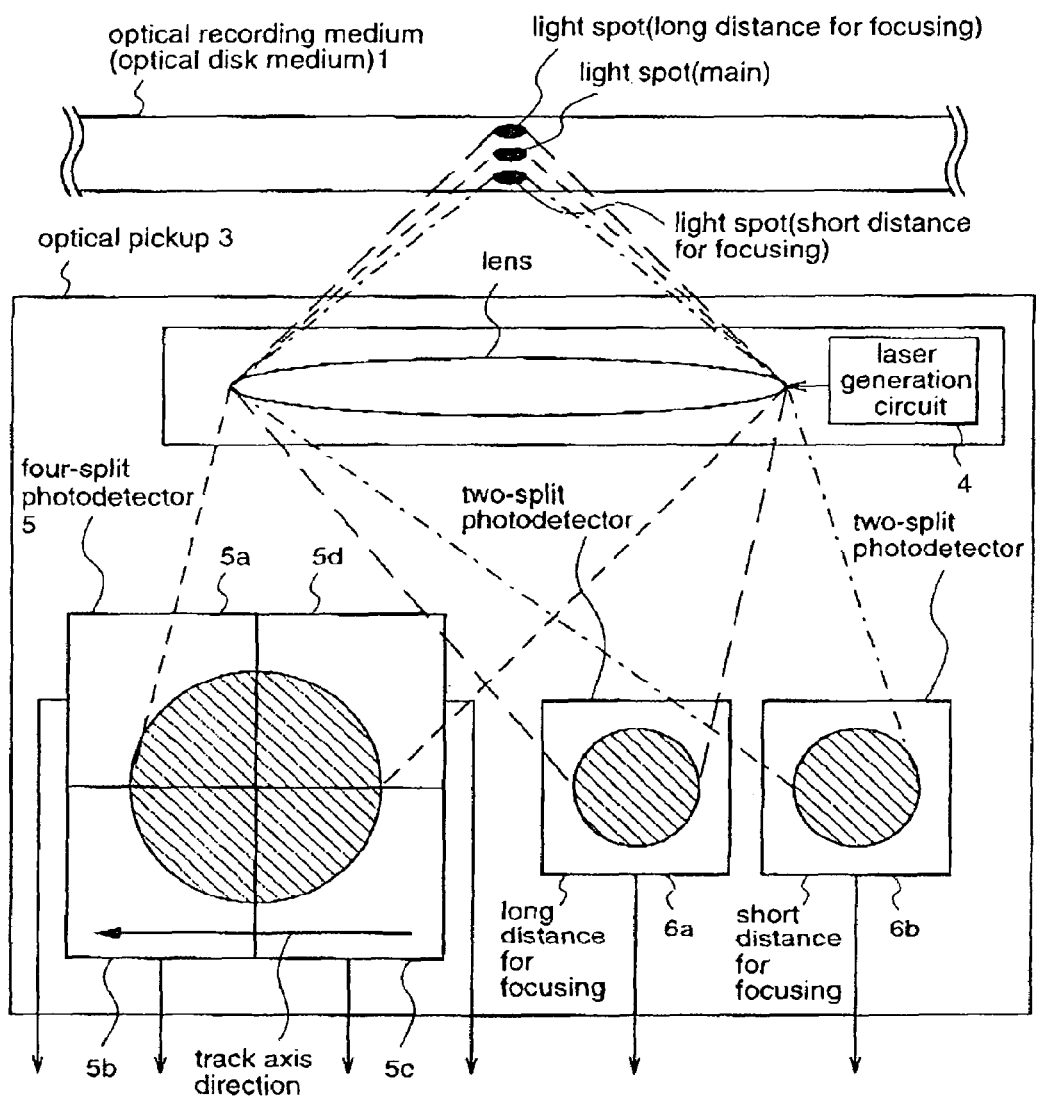
FIG. 2 is a diagram illustrating the construction of an optical pickup 3.

FIG. 1 is a block diagram illustrating the construction of an optical disk device according to a first embodiment of the present invention.

Figure 5:
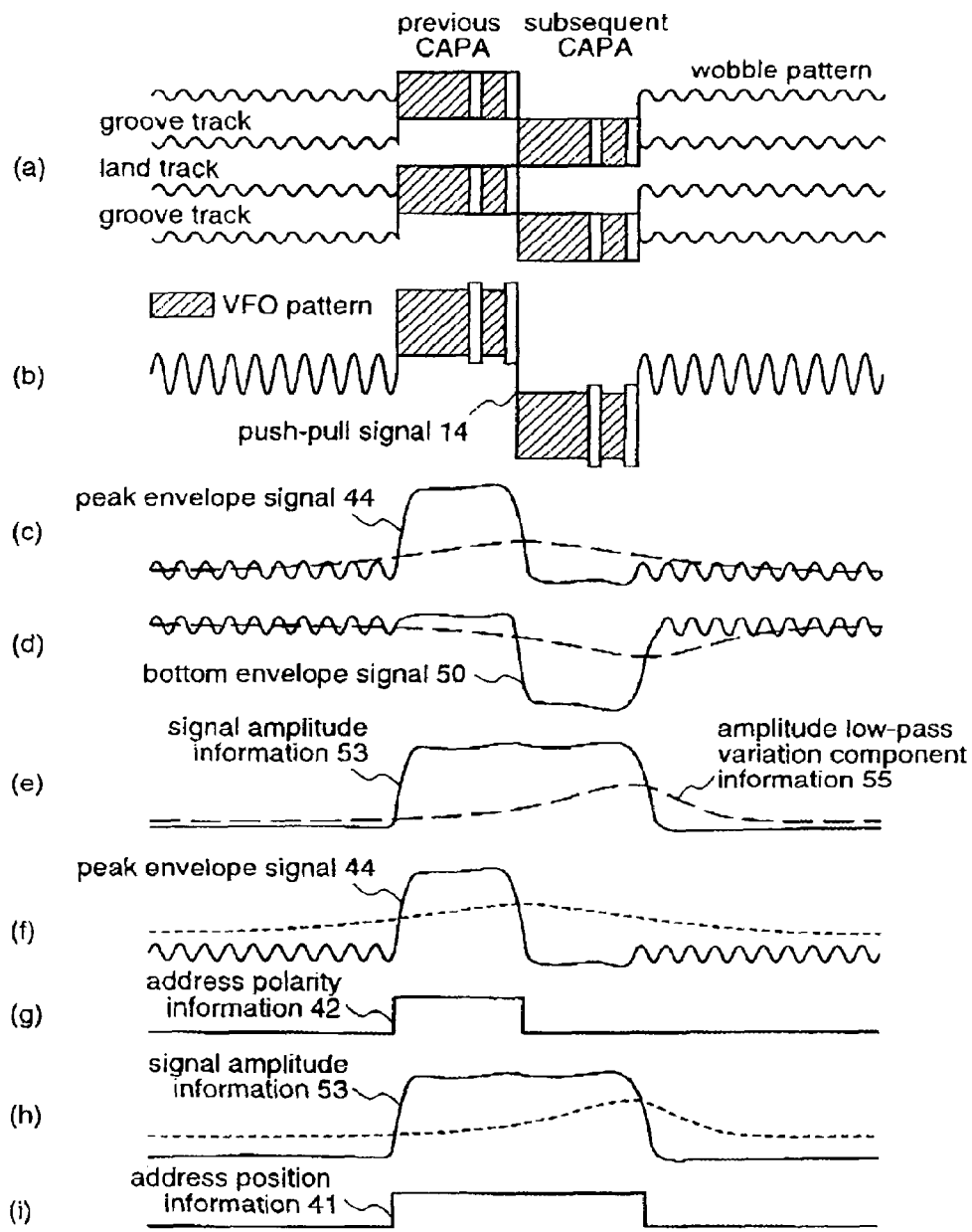
FIG. 5 is a diagram for explaining a principle of generating address polarity information and address position information according to the first embodiment.
Figure 7:
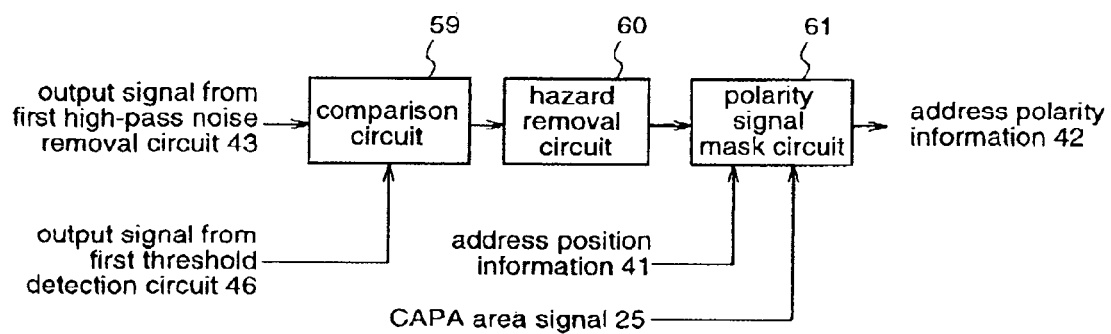
FIG. 7 is a block diagram illustrating the construction of a signal polarity determination circuit according to the first embodiment.

In FIG. 1, an optical recording medium (optical disk medium) 1 is an information storage medium having a thin film made of a phase change recording material for recording digital data, on which tracks are spirally or concentrically formed at regular intervals. A rewritable DVD-RAM disk as an example of the optical disk medium 1 has, as shown in FIG. 5(a), a digital data recording area in which groove tracks and land tracks which are alternately arranged. Address information (CAPA) which is intermittently formed in an embossed area comprises front CAPA and rear CAPA which are positionally inverted so as to correspond to the groove track and the land track, respectively, whereby the front CAPA and the rear CAPA appear antithetically up and down in a push-pull signal (optical difference signal) 14, as shown in FIG. 5(b). Wobble patterns which are carved along tracks as shown in FIG. 5(a) appear as wobble signal components in an area other than the CAPA area, as shown in FIG. 5(b). At this time, no wobble signal components exist in the CAPA area. It becomes possible to determine whether the light spot scans the land track or the groove track, on the basis of the polarity information of the front CAPA and the rear CAPA, and further, it becomes possible to specify demodulated address information.

FIG. 6 is a diagram illustrating a data format of an address area of a DVD-RAM disk, wherein each of VFO1 and VFO2 is constituted by a 4T (T: channel bit frequency) signal pattern. AM (Address Mark) indicates an address mark signal which is a sync signal for detecting a beginning of a PID (Physical ID). Each of PID1~PID4 is 4-byte data, wherein the first 1 byte is sector data and the next 3 bytes are sector numbers, and this data is recorded by 8-16 modulation. IED1~IED4 are error detection codes for the respective PIDs. PA1 and PA2 are codes for recognizing demodulation states of data just before PA. In FIG. 6, numerals indicate the number of bytes in each area.

Figure 4:
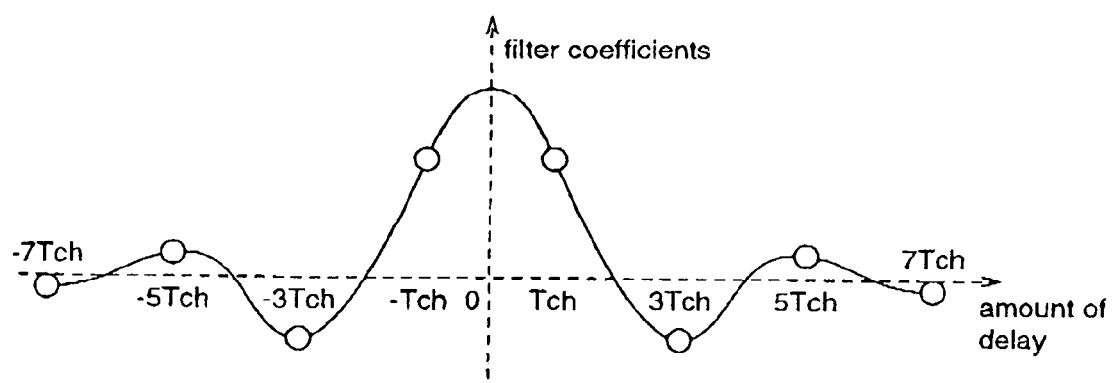
FIG. 4 is a diagram illustrating filter coefficients of a FIR filter applied to a missing data interpolation circuit according to the first embodiment.

An optical difference signal detection circuit 13 generates a push-pull signal (optical difference signal) 14 on the basis of an output signal from an adder 11 and an output signal from an adder 12. A low pass filter (hereinafter referred to as LPF) 15 eliminates high-frequency components of the push-pull signal 14 to generate a tracking error signal 17. An amplitude adjustment circuit 19 adjusts the amplitude of the push-pull signal 14 to an amplitude that is suited to a dynamic range of an input signal to a first analog-to-digital converter 20, and it is constituted by a VGA (Voltage Gain Amplitude) that can arbitrarily vary gain. A clock generation circuit 22 generates a sampling clock 23 that is synchronized with a component of a channel bit frequency of digital data recorded on the optical disk medium, on the basis of the wobble cycle information that is carved along the tracks on the optical disk medium 1. A first analog-to-digital converter 20 converts an output signal 21 of the amplitude adjustment circuit 19, which is an analog signal, into a digital sampling signal 24 as a multiple-bit digital signal, according to the sampling clock 23 generated by the clock generation circuit 22. A missing data interpolation circuit 40 interpolates missing data between sample points of the first AD converter 20, and it is implemented by, as shown in FIG. 4, an FIR (finite impulse Response) filter having filter coefficients that (an restore a Nyquist band. In FIG. 4, an axis of ordinate shows the filter coefficients of the FIR filter, and an axis of abscissa shows the amount of time delay of the FIR filter. Further, a unit Tch indicates one cycle of the channel bit frequency.

An address polarity information detection circuit 48 detects address polarity information 42 indicating the positional relationship between the front CAPA and the rear CAPA on the DVD-RAM disk, on the basis of the digital sampling signal 24 and the interpolation data outputted from the missing data interpolator circuit 40. The address polarity information detection circuit 48 comprises a zone peak detection circuit 38 for detecting a peak value in an arbitrary detection zone from the digital sampling signal 24, a first high-pass noise removal circuit 43 for removing a high-pass noise component of the zone peak value outputted from the gone peak detection circuit 38 to output a peak envelope signal 44, a first low-pass variation component extraction circuit 45 for extracting a low-pass variation component of the peak envelope signal 44, a first threshold value detection circuit 46 for adding an arbitrary offset level to the output signal of the first low-pass variation component extraction circuit 45, and a signal polarity determination circuit 47 for generating address polarity information 42 on the basis of the peak envelope signal 44 and the output signal of the first threshold value detection circuit 46.

An address position information detection circuit 58 detects address position information 41 indicating the CAPA area in the DVD-RAM disk, on the basis of the digital sampling signal 24 and the interpolation data outputted from the missing data interpolation circuit 40. The address position information detection circuit 58 comprises a zone bottom detection circuit 39 for detecting a bottom value in an arbitrary detection zone from the digital sampling signal 24, a second high-pass noise removal circuit 49 for removing a high-pass noise component of the zone bottom value outputted from the zone bottom detection circuit 39 to output a bottom envelope signal 50, a second low-pass variation component extraction circuit 51 for extracting a low-pass variation component of the bottom envelope signal 50, a signal amplitude detection circuit 52 for generating signal amplitude information 53 on the basis of the bottom envelope signal 50 and the peak envelope signal 44, an amplitude low-pass, variation detection circuit 54 for generating amplitude low-pass variation component information 55 on the basis of the output signal of the first low-sass variation component extraction circuit 45 and the output signal of the second low-pass variation component extraction circuit 51, a second threshold value detection circuit 56 for adding an arbitrary offset level to the amplitude low-pass variation component information 55, and an address position detection circuit 57 for generating address position information 41 on the basis of the output signal of the signal amplitude detection circuit 52 and the output signal of the second threshold value detection circuit 56.

An optical disk controller 16 performs control for the optical disk device, such as drive control for the optical pickup 3. An optical pickup drive circuit 18 performs position control so that a light spot emitted from the optical pickup 3 is focused and scans the tracks, using a tracking error signal 17 or the like, and it has a function corresponding to the traverse drive circuit 130 and the actuator drive circuit 131 shown in FIG. 19.

Figure 19:
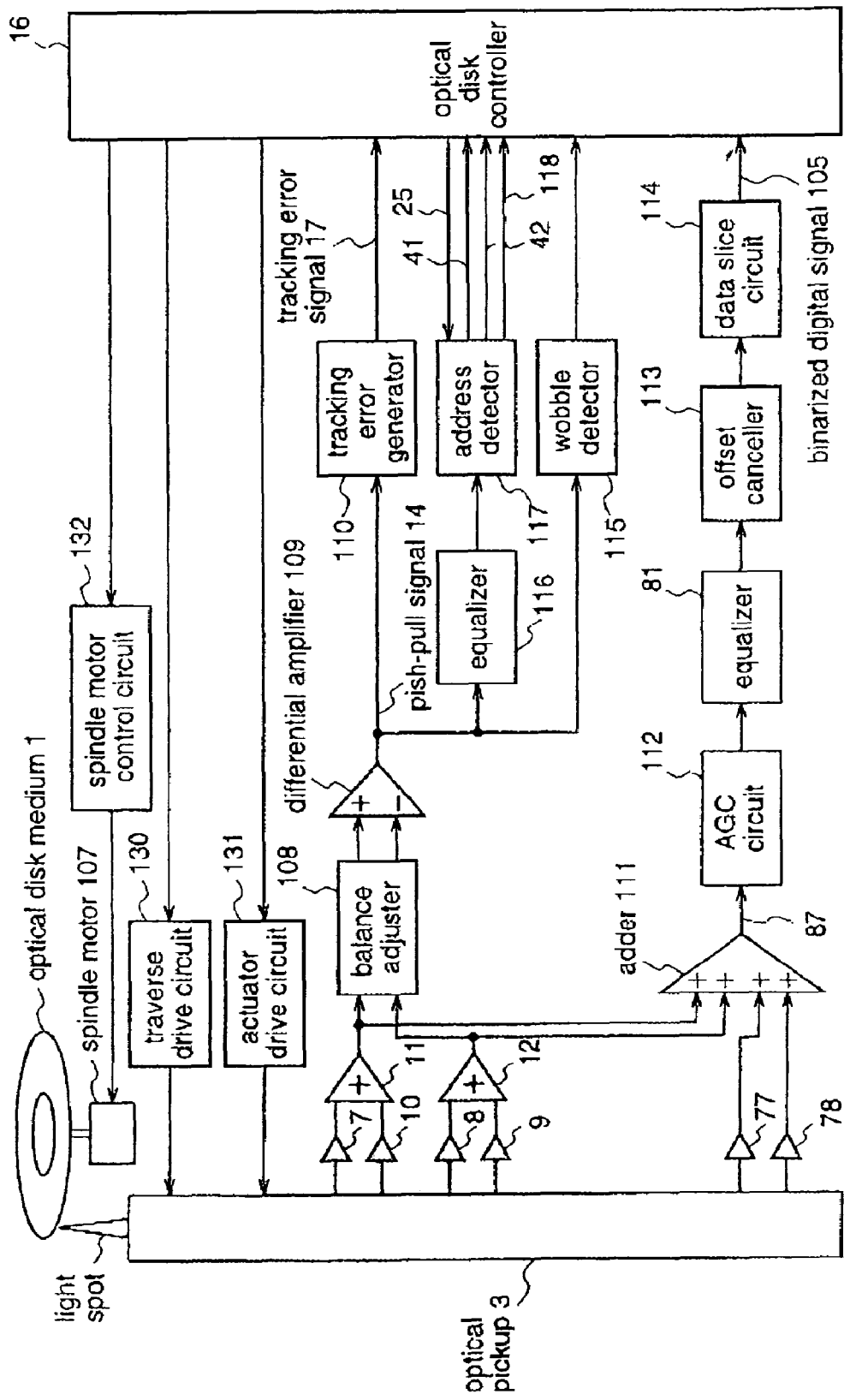
FIG. 19 is a block diagram illustrating the construction of an address detection apparatus in a conventional DVD-RAM disk.
Figure 20:
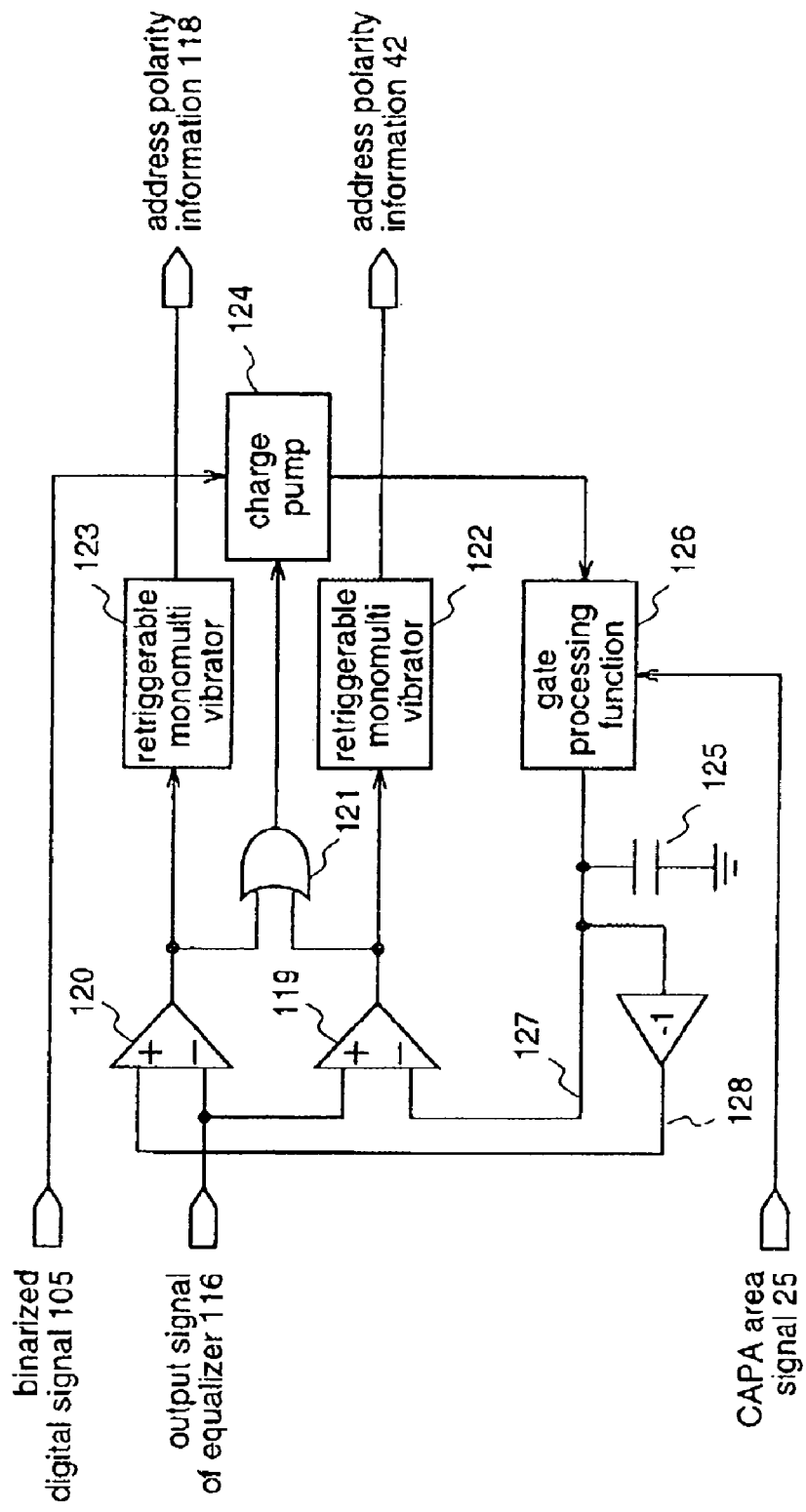
FIG. 20 is a block diagram illustrating the construction of an address detector of the address detection apparatus in the conventional DVD-RAM disk.
Figure 21:
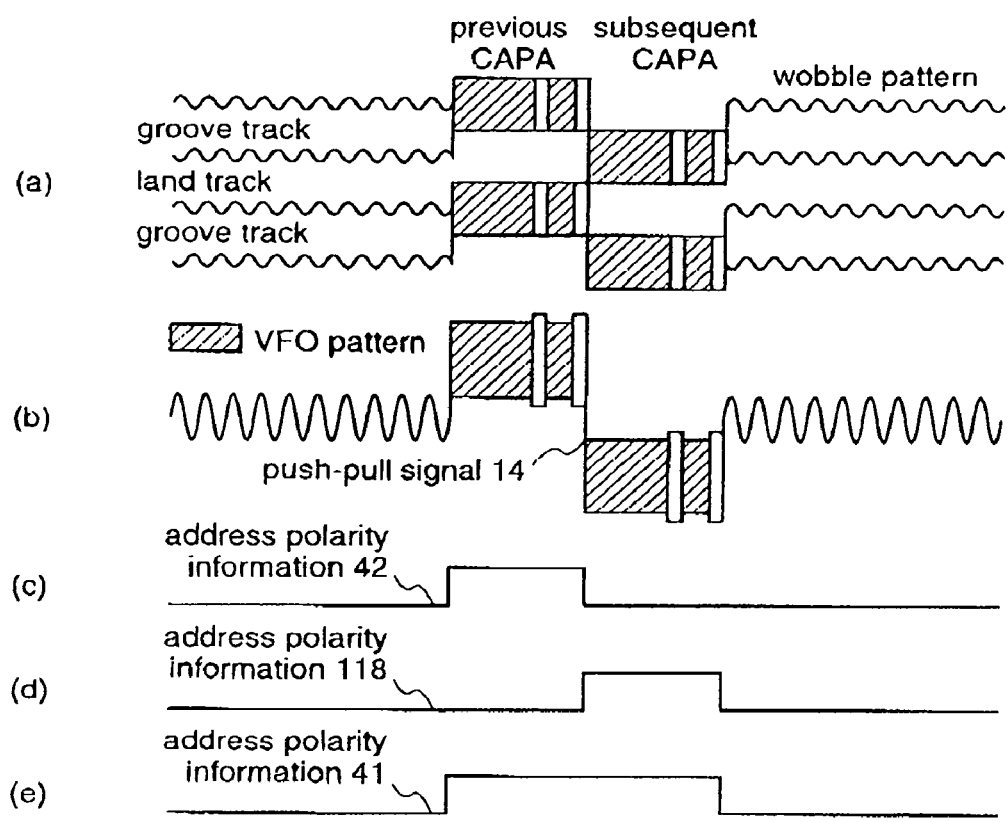
FIG. 21 is a diagram for explaining a principle of generating address polarity information, address polarity information, and address position information of the address detection apparatus in the conventional DYD-RAM disk.

Since the optical recording medium rotation control circuit 2, the optical pickup 3, the I/V converters 7 to 10, and the adders 11 and 12 are identical to those of the conventional address detection apparatus shown in FIG. 19, repeated description is not necessary.

A description will be given of the operation of the optical disk device constructed as described above.

A laser beam emitted from the laser generation circuit 4 of the optical pickup 3 is reflected at the optical disk medium 1, and the reflected beam is received by the four regions 5a to 5d of the four-split photodetector 5. The four-split photodetector 5 outputs detection currents according to the amounts of light received by the respective regions, and the detection currents are converted into voltage values by the I/V converters 7 to 10. The output voltages of the I/V converter 7 and the I/V converter 10 are added by the adder 11 while the output voltages of the I/V converter 8 and the I/V converter 9 are added by the adder 12, and thereafter, outputted to the optical difference signal detection circuit 13.

The optical difference signal detection circuit 13 adjusts the amplitude balance of the output signals from the adder 11 and the adder 12, and then subtracts the output signal of the adder 12 from the output signal of the adder 11, thereby generating a push-pull signal (optical difference signal) 14. The push-pull signal 14 is inputted to the LPF 15, the amplitude adjustment circuit 19, and the clock generation circuit 22.

The LPF 15 removes a high-frequency component of the push-pull signal 14 to generate a tracking error signal 17 that can be handled in a servo band, and outputs the signal 17 to the optical disk controller 16. Further, the amplitude adjustment circuit 19 adjusts the amplitude of the push-pull signal 14 to an amplitude suited to the dynamic range of the input signal to the first AD converter 20.

The clock generation circuit 22 generates, from the push pull signal 14, a sampling clock 23 that is coupled with a frequency corresponding to the channel hit of the digital data recorded on the optical recording medium 1, and outputs the sampling clock 23 to the optical disk controller 16 and the first AD converter 20. Hereinafter, the operation of the clock generation circuit 22 will be described in detail with reference to FIG. 3.

Figure 3:
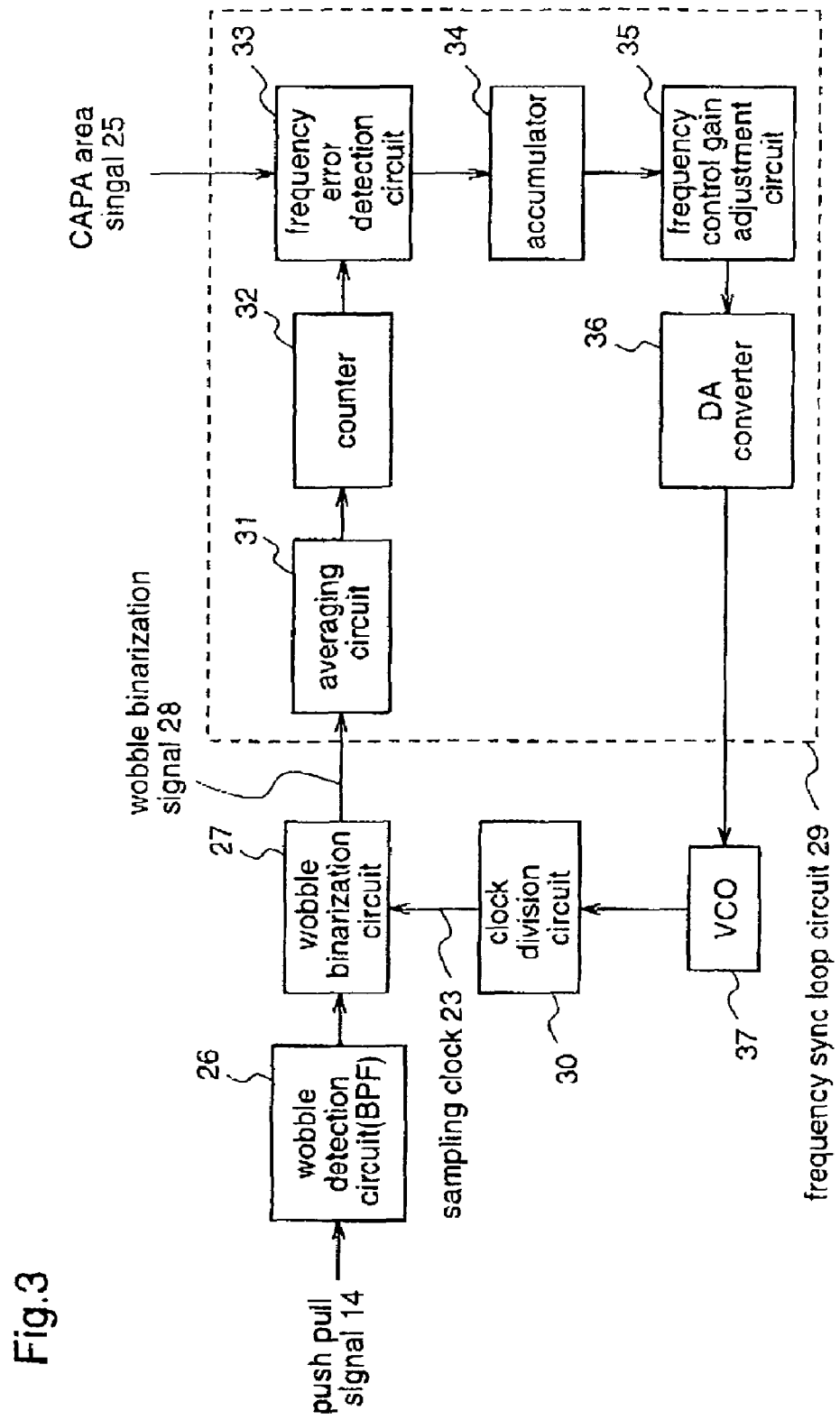
FIG. 3 is a block diagram illustrating the construction of a clock generation circuit 2 according to the first embodiment.

FIG. 3 is a block diagram illustrating the construction of the clock generation circuit 22. As shown in figure 3, the clock generation circuit 22 comprises a wobble detection circuit 26, a wobble binarization circuit 27, a frequency sync loop circuit 29, a voltage controlled oscillator (VCO) 37, and a clock division circuit 30. Further, the frequency sync loop circuit 29 comprises an averaging circuit 31, a counter 32, a frequency error detection circuit 33, an accumulator 34, a frequency control gain adjustment circuit 35, and a DA converter 36.

The clock generation circuit 22 employs, as a main control loop, the wobble binarization circuit 27, the frequency sync loop circuit 29, the voltage controlled oscillator (VOC) 31, the clock division circuit 30, and the wobble binarization circuit 27, and performs feedback control so as to zero the frequency error signal outputted from the frequency error detection circuit 33, thereby generating a digital sampling signal 24 synchronized with the clock component of the wobble included in the push-pull signal 14. Hereinafter, the operation of the clock generation circuit 22 will be described for the case where N=1 as described above, and the case where the frequency division ratio of the clock division circuit 30 is M=1.

The wobble detection circuit 26 receives the push-pull signal 14, detects a wobble pattern carved along the tracks on the optical disk medium 1, which is included in the push-pull signal 14, and outputs a wobble signal to the wobble binarization circuit 27. The wobble detection circuit 26 is constituted by a band pass filter (hereinafter referred to as a BPF) for removing a noise signal other than the frequency components of the wobble signal. Since the use of the BPF enables removal of the RF signal component which appears as crosstalk noise and is detected from the digital data recorded on the optical disk medium 1, the jitter of the wobble signal can be improved.

The wobble signal is binarized to an arbitrary threshold level by the wobble binarization circuit 27, and inputted to the frequency sync loop circuit 29 as a wobble binarization signal 28. The arbitrary threshold level corresponds to an intermediate level between the peak envelope and the bottom envelope of the wobble signal which is outputted from the wobble detection circuit 26.

The frequency sync loop circuit 29 performs control so that the frequency of the clock generated in the clock generation circuit 22 is synchronized with a frequency corresponding to the channel bit of the digital data recorded on the optical disk medium 1 or a frequency that is N times (N: positive integer) as high as the channel bit frequency. To be specific, initially, the averaging circuit 31 averages the glitch noise or edge interval of the wobble binarization signal 28, and outputs the signal to the counter 32. The counter 32 counts one cycle from the rising edge of the signal outputted from the averaging circuit 31 to the next rising edge, with reference to the sampling clock 23. The cycle of the wobble pattern that is carved along the tracks on the DVD-RAM disk is equivalent to 186 channel bits. That is, 1/186 of the channel bit frequency is equivalent to the frequency of the wobble signal. The frequency error detection circuit 33 generates a frequency error signal according to formula (1) as follows, using the output value of the counter 32, and the value of 186 channel bits which is the wobble cycle on the DVD-RAM disk.

(output signal of the frequency error detection circuit 33)=186−(output signal of the counter 32)    (1)

The frequency error signal outputted from the frequency error detection circuit 33 is accumulated by the accumulator 34, and gain adjustment is carried out by the frequency control gain adjustment circuit 35. The digital frequency control signal outputted from the frequency control gain adjustment circuit 35 is converted into an analog control signal by the DA converter 36 to be outputted to the VCO 37. The frequency error detection circuit 33 may subject the frequency error signal to mask processing, in a zone where a wobble signal is not normally detected, by a CAPA area signal 25 generated by the optical disk controller 16. Thereby, it is possible to prevent the wobble cycle information from being disordered in the CAPA area where no wobble signal component exists, whereby the sampling clock is stabilized, and detection of address information is also stabilized.

The VCO 37 generates an oscillation clock in which the cycle of the output voltage of the DA converter 36 is changed according to a reference. The oscillation clock outputted from the VCO 37 is frequency-divided by the clock division circuit 30 (here, M=1), thereby generating a sampling clock 23 that is synchronized with the cycle of the wobble pattern carved in the optical disk medium 2.

The sampling clock 23 generated by the above-mentioned operation is inputted to the first AD converter 20 and to the optical disk controller 16, and it is also utilized as a reference signal for the optical recording medium rotation control circuit 2 and for the CAPA area signal 25.

The first AD converter 20 samples the output signal 21 of the amplitude adjustment circuit 19 according to the sampling clock 23 generated by the clock generation circuit 22, and outputs a digital sampling signal 24 thus obtained to the missing data interpolation circuit 40, the address polarity information detection circuit 40, and the address position information detection circuit 58.

The missing data interpolation circuit 40 interpolates missing data between sample points of the first AD converter 20 by linear interpolation or the like, and outputs the interpolated data to the zone peak detection circuit 30 and to the zone bottom detection circuit 39.

The address polarity information detection circuit 48 generates address polarity information on the basis of the digital sampling signal 24, and further, the address position information detection circuit 58 generates address position information on the basis of the digital sampling signal 24. Hereinafter, the operations of the address polarity information detection circuit 48 and the address position information detection circuit 58 will be described in detail.

Initially, the operation of the address polarity information detection circuit 48 will be described.

The zone peak detection circuit 38 detects a peak level in an arbitrary zone while maintaining a larger value between the peak level that is held for every sampling clock 23 and the input signal. When the sampling clock 23 is in the vicinity of the channel bit frequency that is recorded on the optical disk medium 1, the zone peak detection circuit 38 detects a zone peak value from the digital sampling signal 24. When the sampling clock 23 is in the vicinity of a frequency that is half the channel bit frequency, the zone teak detection circuit 38 compares the interpolation signal outputted from the missing data interpolation circuit 40 with the digital sampling signal 24 to detect a zone peak value. The arbitrary detection zone of the zone peak detection circuit 38 takes an important role for accurately detecting the address position information 41, and therefore, it should be set so as to follow a change in the wobble signal and to detect a peak envelope in the CAPA area, according to the format of the recorded digital data and the cycle of the wobble signal component. For example, on a DVD-PAM disk, an arbitrary detection zone should shorter than the wobble signal cycle corresponding to the 186 channel bit cycle and larger than a VFO (Voltage Frequency Oscillator) pattern that in a continuous pattern of the 8-channel bits existing in the address section.

Figure 9:
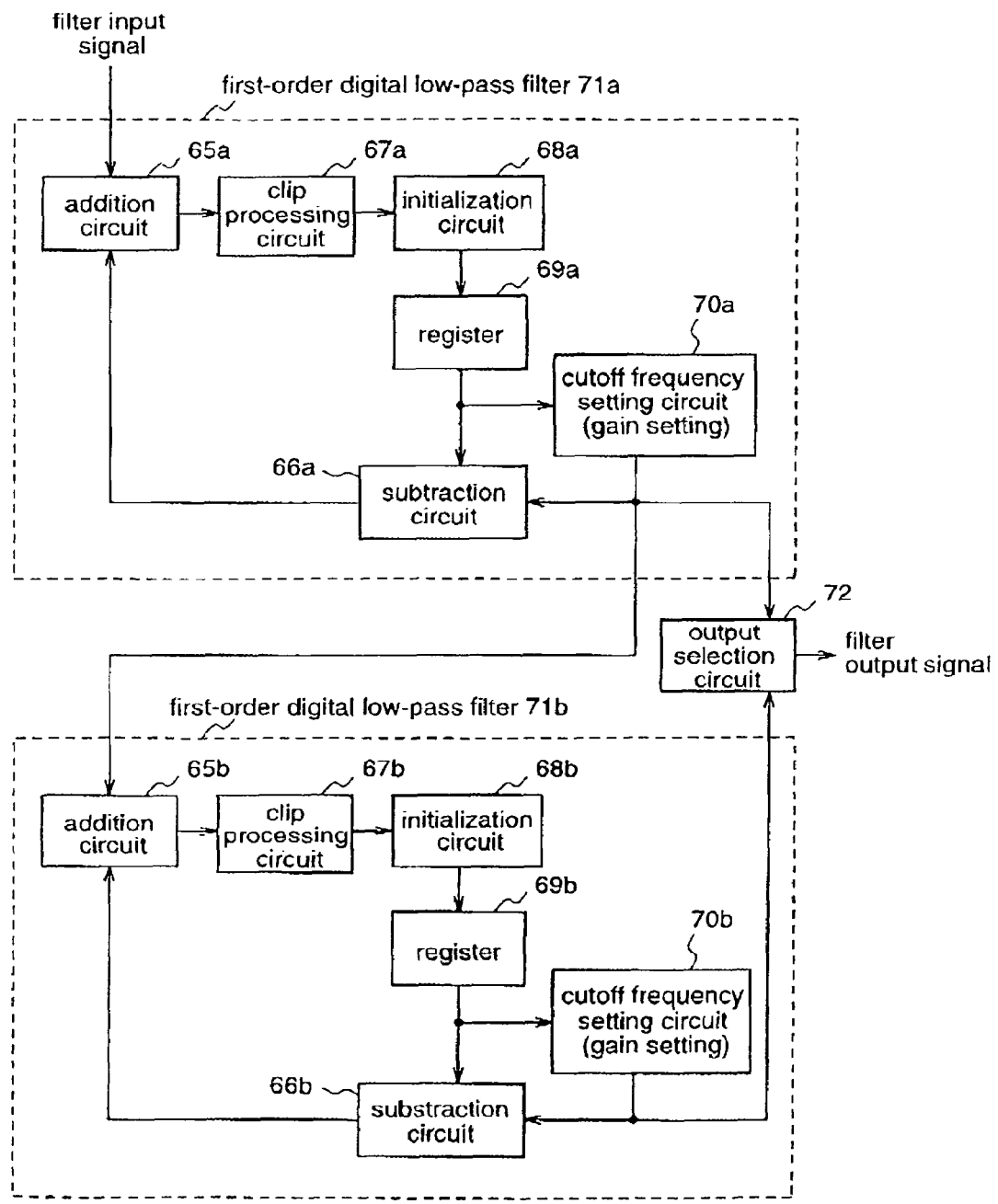
FIG. 9 is a block diagram illustrating the construction of a second order digital low-pass filter according to the first embodiment.

A high-pass noise component is removed from the output signal of the zone peak detection circuit 38 by the first high-pass noise removal circuit 43, whereby a peak envelope signal 44 as shown by full line in FIG. 5(c) is outputted to the first low-pass variation component extraction circuit 45 and to the signal polarity determination circuit 47. In this first embodiment, the first high-pass noise removal circuit 43 is constituted by, for example, a second order digital low-pass filter which is an application circuit of a recursive filter as shown in FIG. 9. That is, as shown in FIG. 9, a filter input signal is initially inputted to an addition circuit 65a of a first order digital low-pass filter 71a. The addition circuit 65a adds the filter input signal and the output signal of a subtraction circuit 66a. The output signal of the addition circuit 65a is inputted to a clip processing circuit 67a, wherein, when an upper limit value exceeds a maximum bit width, the signal is clipped to an upper limit value or a lower limit value that is most approximate to the maximum bit width. The output signal of the clip processing circuit 67a is inputted to an initialization circuit 68a, initialization is carried out at start-up of the first order digital low-pass filter 71a and at switching of the drive clock. The output signal of the initialization circuit 68a is inputted to a register 69a which has a function of holding inputted digital data at a timing of drive clock, and thereafter, it is inputted to a cutoff frequency setting circuit 70a for setting a cutoff frequency of the first order digital low-pass filter 71a and to the subtraction circuit 66a. The cutoff frequency setting circuit 70a may be a circuit that simply adjusts the gain, such as a bit-shift circuit. The subtraction circuit 66 has a function of subtracting the output signal of the first order digital low-pass filter 71a (i.e., the output signal of the cutoff frequency setting circuit 70) from the output signal of the register 69.

Subsequently, the output signal of the first order digital low-pass filter 71a is inputted to another first order digital low-pass filter 71b in the subsequent stage. The subsequent-stage first order digital low-pass filter 71b has the same construction as the first order digital low-pass filter 71a. The output signal of the previous-stage first order digital low-pass filter 71a and the output signal of the subsequent-stage first order digital low-pass filter 71b are inputted to a selection circuit 72, and one of these input signals is selected.

The peak envelope signal 44 as an output signal from the first high-pass noise removal circuit 43 is subjected to extraction of a low-pass variation component by the first low-pass variation component extraction circuit 45, and converted into a signal as shown by a dotted line in FIG. 5(c). The first low-pass variation component extraction circuit 45 may be constituted by a second order digital low-pass filter which is an application circuit of a recursive filter as described above, like the first high-pass noise removal circuit 43.

An arbitrary offset level is added to the output signal of the first low-pass variation component extraction circuit 45 by the first threshold value detection circuit 46, whereby the signal level is converted to a threshold value level as shown by a dotted line in FIG. 5(f), and thereafter, the signal is outputted to the signal polarity determination circuit 47.

The signal polarity determination circuit 47 compares the output signal of the first high-pass noise remove) circuit 43 and the output signal of the first threshold value detection circuit 46 to generate address polarity information 42 as shown in FIG. 5(g). The signal polarity determination circuit 47 has a comparison circuit 59, a spike removal circuit 60, and a polarity signal mask circuit 61. Initially, the comparison circuit 59 compares the output signal of the first high-pass noise removal circuit 43 with the output signal of the first threshold value detection circuit 46. The comparison circuit 59 outputs "1" when the output signal of the first high-pass noise removal circuit 43 is larger than the output signal of the first threshold value detection circuits 46, and outputs "0" in other cases. Next, the spike removal circuit 60 removes spike pulses which do not reach an arbitrary time range, when continuity of the section where the output signal of the comparison circuit 59 is "1" is deteriorated.

The polarity signal mask circuit 61 receives the output signal of the spike removal circuit 60, and enables the address polarity information 42 for a section which is thought to be a CAPA area, on the basis of the CAPA area signal 25 outputted from the optical disk controller 16, while performing mask processing for other sections, thereby generating address polarity information 42. The polarity signal mask circuit 61 may enable the address polarity information 42 for a section which is thought to be a CAPA area, on the basis of the address position information 41 outputted from the address position detection circuit 57, while performing mask processing for other sections, thereby generating address polarity information 42.

The address polarity information detection circuit 48 generates address polarity information 42 by the above-mentioned operation, and outputs it to the optical disk controller 16.

Next, the operation of the address position information detection circuit 58 will be described.

The zone bottom detection circuit 39 detects a zone bottom level in an arbitrary zone while maintaining a smaller value between the bottom level that is held for every sampling clock 23 and the input signal. When the sampling clock 23 is in the vicinity of the channel bit frequency that is recorded on the optical disk medium 1, the zone bottom detection circuit 39 detects a zone bottom value from the digital sampling signal 24. When the sampling clock 23 is in the vicinity of a frequency that is half the channel bit frequency, the zone bottom detection circuit 39 compares the interpolation signal outputted from the missing data interpolation circuit 40 with the digital sampling signal 24 to detect a zone bottom value. The arbitrary detection zone of the zone bottom detection circuit 39 takes an important role for accurately detecting the address position information 41 like the arbitrary detection zone of the above-mentioned zone peak detection circuit 38, and therefore, it should be set so as to follow a change in the wobble signal and to detect a bottom envelope in the CAPA area, according to the format of the recorded digital data and the cycle of the wobble signal component.

A high-pass noise component is removed from the output signal of the zone bottom detection circuit 39 by the second high-pass noise removal circuit 49, whereby a bottom envelope signal 50 as shown by a full line in FIG. 5(d) is outputted to the second low-pass variation component extraction circuit 51 and to the signal amplitude detection circuit 52. The bottom envelope signal 50 is converted into a signal from which a low-pass variation component is extracted, as shown by a dotted line in FIG. 5(d), by the second low-pass variation component extraction circuit 51. Further, a difference between the bottom envelope signal 50 inputted to the signal amplitude detection circuit 52 and the peak envelope signal 44 outputted from the first high-pass noise removal circuit 43 is calculated, thereby generating signal amplitude information 53 shown by a full line in FIG. 5(e). Likewise, the output signal or the first low-pass variation component extraction circuit 45 and the output signal of the second low-pass variation component extraction circuit 51 are inputted to the amplitude low-pass variation detection circuit 54, and thereafter, a difference between these signals is calculated, thereby generating amplitude low-pass variation component information 55 shown by a dotted line in FIG. 5(e). The second high-pass noise removal circuit 49 and the second low-pass variation component extraction circuit 51 may be implemented by a second order digital low-pass filter which is an application circuit of a recursive filter as described above, like the first high-pass noise removal circuit 43.

Figure 8:
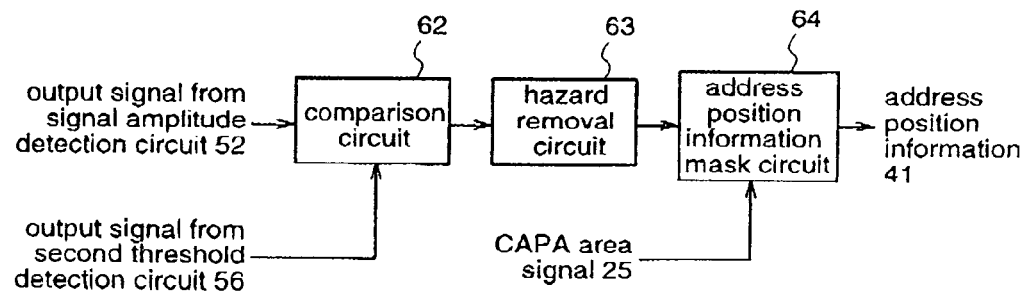
FIG. 8 is a block diagram illustrating the construction of an address position detection circuit according to the first embodiment.

In the second threshold detection circuit 56, an arbitrary offset level is added to the amplitude low-pass variation component information 55 outputted from the amplitude low-pass variation detection circuit 54, and thereby the amplitude low-pass variation component information 55 is converted into a signal of a threshold level shown by a dotted line in FIG. 5(h). The output signal of the signal amplitude detection circuit 52 shown by the full line in FIG. 5(h) and the output signal of the second threshold detection circuit 56 shown by the dotted line in FIG. 5(h) are inputted to the address position detection circuit 57, and thereafter, these signals are compared to each other, thereby generating address position information shown in FIG. 5(i). The address position detection circuit 57 includes, as shown in FIG. 8, a comparison circuit 62, a spike removal circuit 63, and an address position information mask circuit 64, like the signal polarity determination circuit 47 included in the address polarity information detection circuit 48. The spike removal circuit 63 compensates continuity of the address polarity information, and the address position information mask circuit 64 performs mask processing on the address polarity signals in sections other than a section that is thought to be a CAPA area, thereby reducing false detection of the address position information 41 in the areas other than the area where the address information exists.

The address position detection circuit 57 generates highly precise address position information 41 by the above-mentioned operation, and outputs it to the optical disk controller 16.

The optical disk controller 16 generates a CAPA area signal 25 on the basis of the address position information 41 and the address polarity information 42, and performs tracking control by controlling the optical pickup drive circuit 18 so as to perform switching between a land track and a groove track which are alternated for every cycle.

In the address position information detection circuit 58 according to the first embodiment, the output signal of the amplitude low-pass variation circuit 54 is converted to the threshold value level. However, signal amplitude information 53 shown by a full line in FIG. 5(e) may be converted into a signal having the threshold level shown by the dotted line in FIG. 5(h). To be specific, after the signal amplitude information 53 is inputted to the second low-pass variation component extraction circuit 51, amplitude low-pass variation component information 55 shown by a dotted line in FIG. 5(e) is generated, and an arbitrary offset level is added to the amplitude low-pass variation component information 55. In this case, the output signal of the signal amplitude detection circuit 52 is inputted to the second low-pass variation component extraction circuit 51 to extract a low-pass variation component from the signal, whereby the amplitude difference information of the envelope signal after removal of high-pass noise components on the peak side and the bottom side becomes common with the bottom level of the low-pass variation component information detected from the amplitude difference information, and therefore, setting of a threshold value for detecting the address position information is facilitated. Further, construction of a digital filter for detecting a low-pass variation component can be simplified. Furthermore, since the variation range of the low-pass variation component becomes a positive value with the zero level as a reference, the bit width after gain adjustment in the cutoff frequency setting circuit 70 of the digital low-pass filter can be smaller than the bit widths of the output signals from the previous stage first order digital low-pass filter 71a and the subsequent-stage first order digital low-pass filter 71b, whereby the cutoff frequency of the filter can be set at the low-frequency area side while suppressing an increase in the circuit scale, resulting in a reduction in cost of the optical disk device.

Further, a clock for driving the register 69 determines the cutoff range of the second order digital low-pass filter shown in FIG. 9, and it may be a clock in proportion to the sampling clock 23 generated by the clock generation circuit 22.

As described above, according to the first embodiment, when detecting address position information from an optical recording medium in which address information exists intermittently in an embossed area, a push-pull signal is digitized using a clock synchronized with a channel bit of the optical recording medium, and address position information is detected with reference to a difference in signal amplitudes of envelope signals after removal of a high-pass noise between a peak side and a bottom side of the digital signal, whereby continuity of the address position information is ensured. Therefore, the address information can be detected with high accuracy, resulting in an increase in the recording/playback performance of the optical disk device. Further, since a greater part of the function for detecting the address information can be implemented by a digital signal processing circuit, when the function is implemented by a semiconductor integrated circuit, reductions in circuit scale and power consumption are realized.

Further, in the present invention, since a sampling clock of at frequency corresponding to the channel bit of digital data recorded on the optical recording medium is generated on the basis of the cycle of a wobble signal that is detected from the optical recording medium, it becomes unnecessary to change the multiplier of the digital signal processing circuit according to the recording/playback speed. Therefore, when the function is implemented by a semiconductor integrated circuit, the construction thereof can be simplified and the circuit scale thereof can be reduced.

Further, when the sampling clock 23 generated by the clock generation circuit 22 is in the vicinity of a frequency that is half the channel bit frequency of the digital data recorded on the optical recording medium 1, missing data are recovered by the missing data interpolation circuit 40. Therefore, detection of the address information can be carried out with an accuracy equivalent to that ill the case where the sampling clock is in the vicinity of the channel bit frequency, whereby performance of the optical disk device can be maintained during high-speed recording/playback even though the sampling clock is half the channel bit frequency, and furthermore, a reduction in power consumption can be realized.

Furthermore, in this first embodiment, a high-pass noise component of a filter input signal is removed by a second order digital low-pass filter that is implemented by serial connection with a recursive digital filter. Therefore, by applying such a simple recursive digital low-pass filter, the scale of the digital circuit can be reduced, resulting in a reduction in cost of the optical disk device.

Further, in this first embodiment, the arbitrary detection zone of the zone peak detection circuit 38 and the zone bottom detection circuit 39 is set so that it follows changes in the wobble signal and a peak envelope and a bottom envelope are detected in the CAPA area, according to the format of the recorded digital data and the cycle of the wobble signal component. Therefore, when detecting the address polarity information and the address position information, a greater part of the wobble signal component can be removed, and further, the envelopes in the necessary CAPA area can be sensitively detected. Thereby, even when a lot of noises are imposed onto the push-pull signal, the address polarity information and the address position information can be accurately detected, resulting in an increase in resistance-to-noise of the optical disk device.

Further, when detecting an address polarity signal, spike pulses of an arbitrary width are removed from the address polarity information to ensure continuity of the address polarity information, and areas of the address polarity signal other than the area that is thought to be a CAPA area are subjected to mask processing. Therefore, false detection of the address polarity information can be reduced in the areas other than the region where the address information exists, whereby the address polarity information can be detected with high accuracy even when noise after seek operation is great, or low-pass variation in the optical difference signal based on disturbance of tracking servo is significant.

Embodiment 2

A second embodiment of the present invention corresponds to the invention described in claim 8, and realizes improved recording/playback performance of a DVD-RAM by accurately detecting address position information indicating a CAPA area even when an amplitude component of a VFO signal in a push-pull signal detected in the CAPA area is degraded during high-speed recording/playback. For example, when reading data from an optical disk medium 1 at high speed, there may be a case where, as shown in FIG. 11(b), a sufficient signal amplitude cannot be obtained in a VFO area or the like which is a 4 T continuous pattern, depending on performance of an optical pickup 3 or high-pass characteristics of an analog filter or the like. However, an optical disk device according to the second embodiment can realize improvement in recording/playback performance of a DVD-RAM even in the above-mentioned case.

Figure 10:
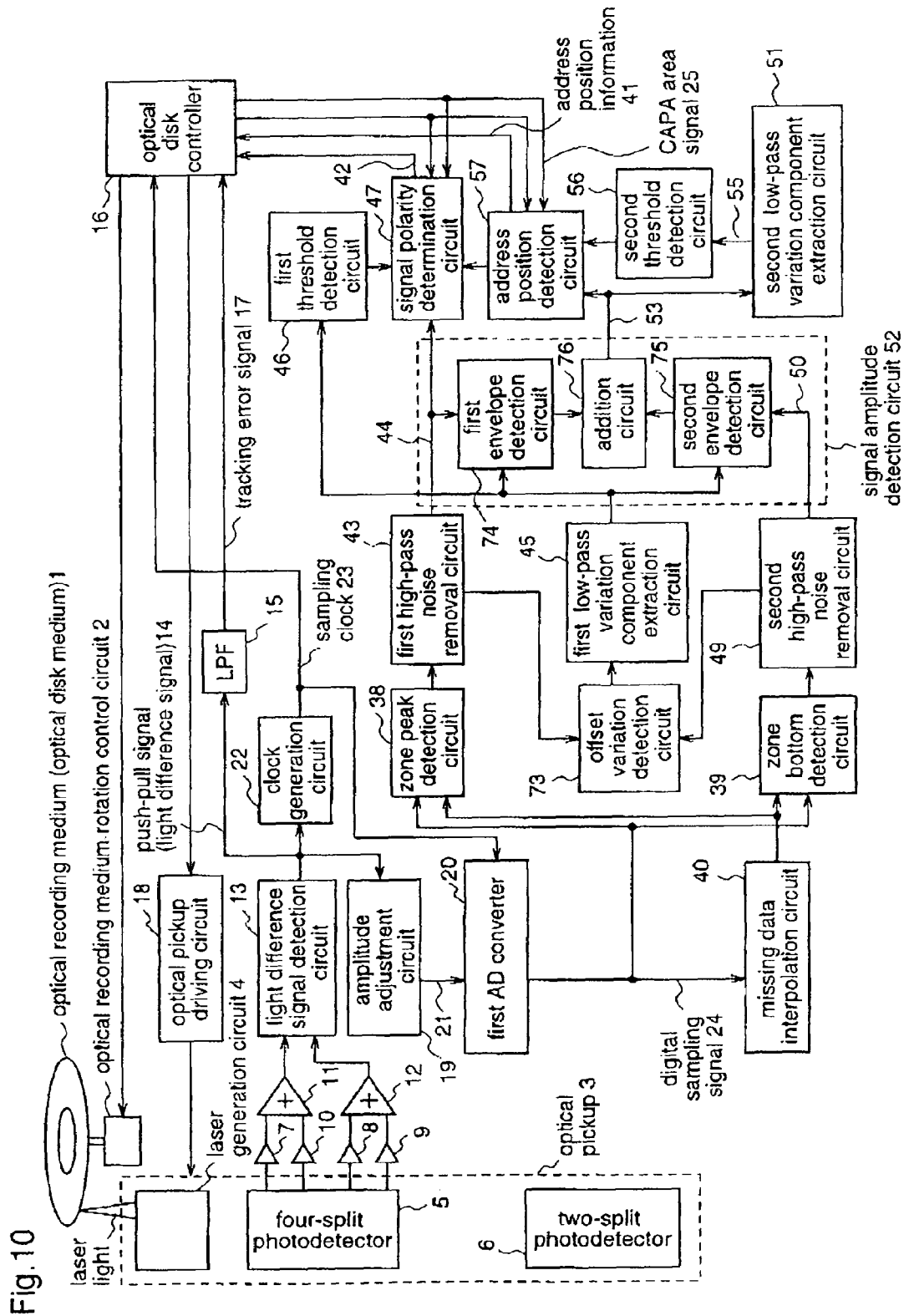
FIG. 10 is a block diagram illustrating the construction of an optical disk device according to a second embodiment of the present invention.

FIG. 10 is a block diagram illustrating the construction of an optical disk device according to the second embodiment. In FIG. 10, the same reference numerals as those described for the first embodiment denote the same parts.

The optical disk device according to the second embodiment is different from the optical disk device according to the first embodiment in that it includes an offset variation detection circuit 73, in the internal construction of the signal amplitude detection circuit 52, and in the roles of the first low-pass variation component extraction circuit 45 and the first; threshold value detection circuit 46.

With reference to FIG. 10, the offset variation detection circuit 73 receives a peak envelope signal 44 as shown by a full line in FIG. 11(c) and a bottom envelope signal 50 as shown by a full line in FIG. 11(d), and extracts offset information of the push-pull signal 14 as shown by a full line in FIG. 11(e). Although the signal amplitude detection circuit 52 generates signal amplitude information 53 alike the signal amplitude detection circuit 52 of the first embodiment, it is provided with, in contrast to the first embodiment, a first envelope detection circuit 74, a second envelope detection circuit 75, and an addition circuit 76.

A description will be given of the operation of the optical disk device constructed as mentioned above, for generating address polarity information 42 and address position circuit 41.

Initially, the operation of generating address polarity information 42 will be described.

The peak envelope signal 44 outputted from the first high-pass noise removal circuit 43, which is shown by the full line in FIG. 11(c), and the bottom envelope signal 50 outputted from the second high-pass noise removal circuit 49, which is shown by the full line in FIG. 11(d), are input to the offset variation detection circuit 73, and the peak envelope signal 44 and the bottom envelope signal 50 are added, and thereafter, the gain is halved, thereby extracting offset information of the push-pull signal 14, which is shown by the full line in FIG. 11(e).

The offset information detected by the offset variation detection circuit 73 is inputted to the first low-pass variation component extraction circuit 45, and thereafter, converted into a signal from which a low-pass variation component is extracted, as shown by a dotted line in FIG. 11(e). Arbitrary offset level is added to the output signal of the first low-pass variation component extraction circuit 45 by the first: threshold value detection circuit 46 to be converted into signal having a threshold value level as shown by a dotted line in FIG. 11(f).

The output signal of the firsts high-pass noise removal circuit 43 as shown by a full line in FIG. 11(f) and the output signal of the first threshold detection circuit 46 as shown by a dotted line in FIG. 11(f) are inputted to the signal polarity determination circuit 47, and thereafter, compared with each other, thereby generating address polarity information 42 as shown in FIG. 11(g).

Next, the operation for generating address position information 41 will be described.

Initially, the peak envelope signal 44 outputted from the first high-pass noise removal circuit 42 and the output signal of the first low-pass variation component extraction circuit 45 are inputted to the first envelope detection circuit 74. The first envelope detection circuit 74 calculates a difference between these signals, and then calculates an absolute value thereof.

Further, the bottom envelope signal 50 outputted from the second high-pass noise removal circuit 49 and the output signal from the first low-pass variation component extraction circuit 45 are inputted to the second envelope detection circuit 75. The second envelope detection circuit 75 calculates a difference between these signals, and then calculates an absolute value thereof.

Figure 11:
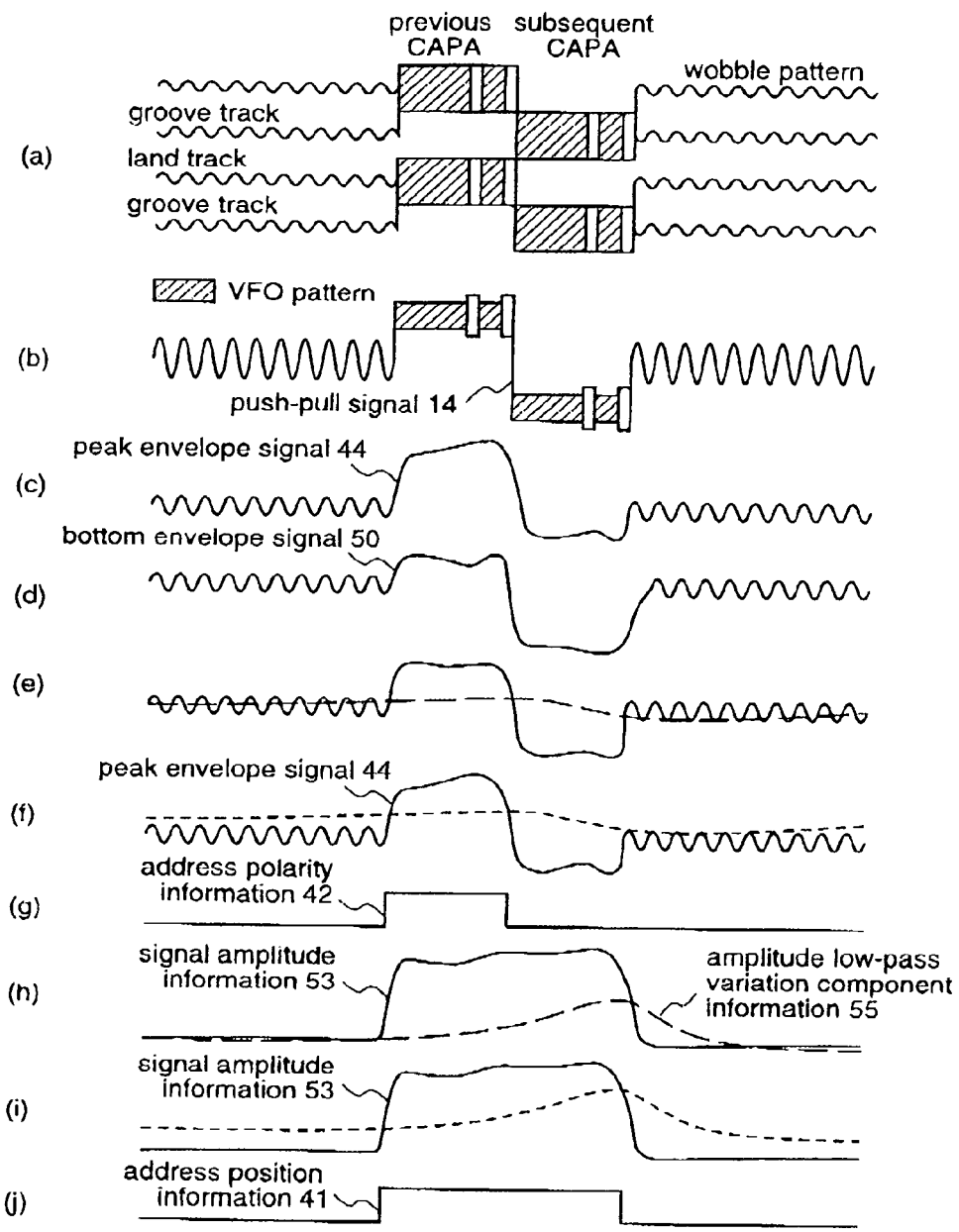
FIG. 11 is a diagram for explaining a principle of generating address polarity information and address position information according to the second embodiment.

The output signals from the first envelope detection circuit 74 and the second envelope detection circuit 75 are input to the addition circuit 76, and the addition circuit 76 adds these signals, thereby generating signal amplitude information 53 as shown by a full line in FIG. 11(*h*).

The signal amplitude information 53 outputted from the addition circuit 76 is input to the second low-pass variation component extraction circuit 51, thereby generating amplitude low-pass variation component information 55 as shown by a dotted line in FIG. 11(*e*). An arbitrary offset level is added to the amplitude low-pass variation component information 55 outputted from the second low-pass variation component extraction circuit 51 by the second threshold value detection circuit 56 to be converted into a signal having a threshold value level as shown by a dotted line in FIG. 11(*h*).

The output signal from the addition circuit 76, which is shown by a full line in FIG. 11(*h*), and the output signal from the second threshold detection circuit 56, which is shown by a dotted line in FIG. 11(*h*) are inputted to the address position detection circuit; by, and thereafter, compared with each other, thereby generating address position information 41 as shown in FIG. 11(*j*).

As described above, according to the second embodiment of the invention, the address position information is detected on the basis of the absolute values of the distance from the center level of the optical difference signal to the peak side and the distance from the center level of the optical difference signal to the bottom side. Therefore, recording/playback performance of the optical disk device can be favorably maintained even when the signal amplitude of the optical difference signal is degraded, for example, when defocusing occurs, that is, a focus position of a light spot deviates from a recording information surface, or when high-pass frequency characteristics of an analog circuit are degraded during high-speed recording/playback.

Embodiment 3

A third embodiment of the present invention corresponds to claims 7 to 19. According to this third embodiment, the optical disk device described for the first embodiment is further provided with a function of extracting a BCA signal from a playback RF signal, and the clock generation circuit 22 has, a function of performing control so that the phase of the frequency of the sampling clock 23 is synchronized with the phase of the clock component of the digital data recorded on the optical disc medium 1.

Figure 12:
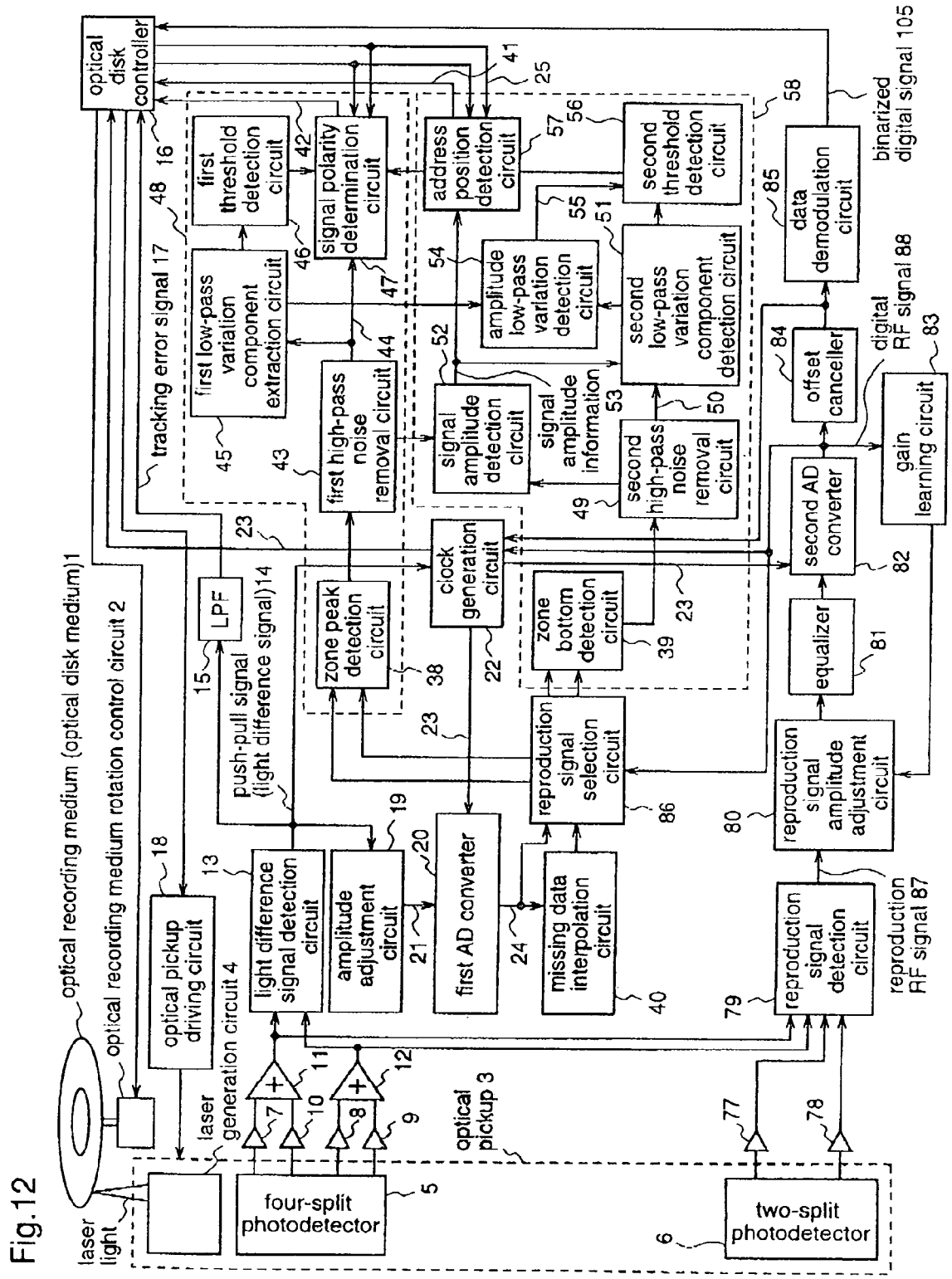
FIG. 12 is a block diagram illustrating the construction of an optical disk device according to a third embodiment of the present invention.

FIG. 12 is a block diagram illustrating the construction of an optical disk device according to the third embodiment. In FIG. 12, the same reference numerals as those described for the first embodiment denote the same parts.

Figure 17:
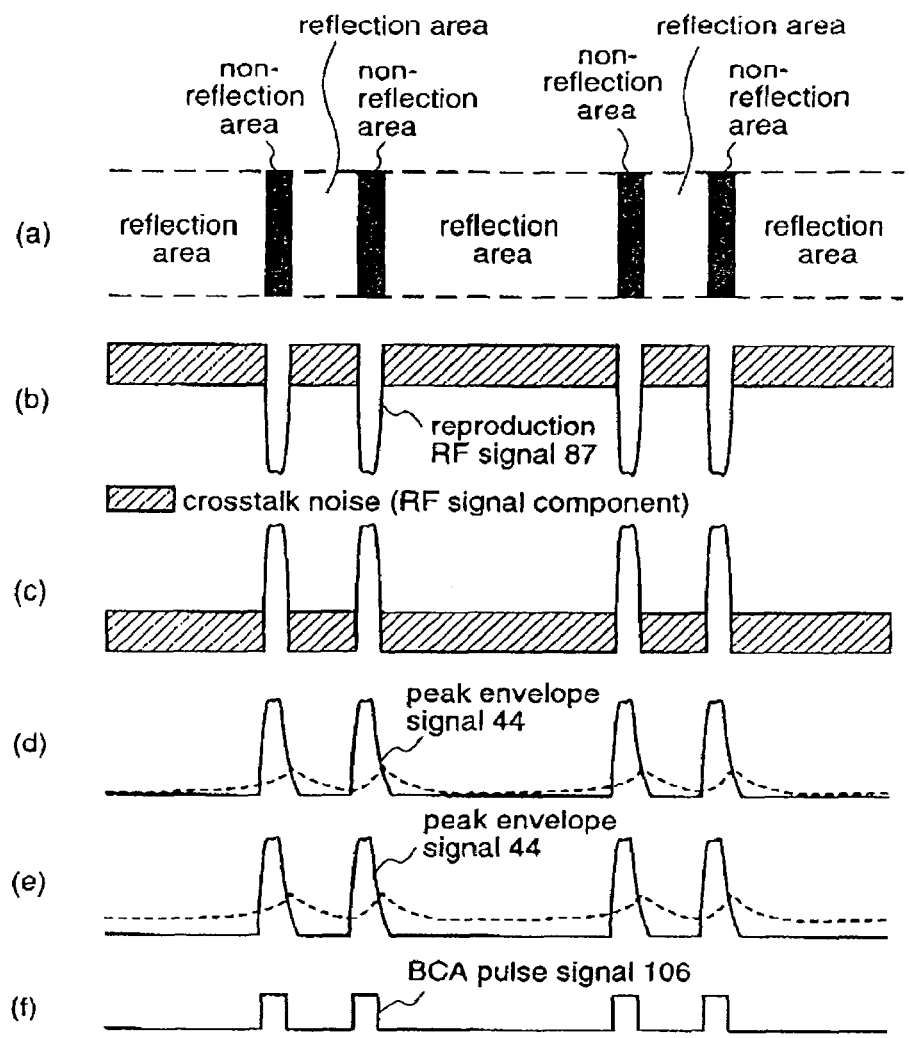
FIG. 17 is a diagram for explaining a principle of generating a BCA pulse signal from a writable optical disk according to the third embodiment.

With reference to FIG. 12, the optical disk medium 1 is not restricted to a DVD-RAM disk that is described in the second embodiment, and it may be an optical disk medium in which BCA information is stored. For example, the optical disk medium 1 may be a DVD-ROM (DVD-Read Only Memory) disk for playback only, a write-once DVD-R disk, or a re-writable DVD-RW disk. As for the BCA information, light reflection regions which are surrounded with dotted lines and non-reflection or low-reflection amount regions that are blacked out are written along the track direction at the inner circumference portion of the optical disk medium 1, and this barcode pattern includes various kinds of information relating to the optical disk medium 1 such as copy protect information which plays an important role in copyright protection for a DVD-Video. In a recordable DVD represented by a DVD-RAM disk or a DVD-R disk, BCA information is detected from the optical pickup 3 as a playback RF signal 87 as shown in FIG. 17(*b*). In FIG. 17(*b*), the upper side has a larger amount of reflected light and is bright, and the lower side has a smaller amount of reflected light and is dark. A hatched region indicates that the RF signal component leaks in due to crosstalk noise or the like.

I/V converters 77 and 78 are current-to-voltage converters for converting detected currents outputted from the two-split photodetectors 6*a* and 6*b* into voltages, respectively. A playback signal detection circuit 79 adds the output voltages of the I/V converters 7 to 10 which are the full output components of the four-split photodetector 5 and the output voltages of the I/V converters 77 and 78 which are the output components of the two-split photodetector 6, thereby generating a playback RF signal 87.

Figure 13:
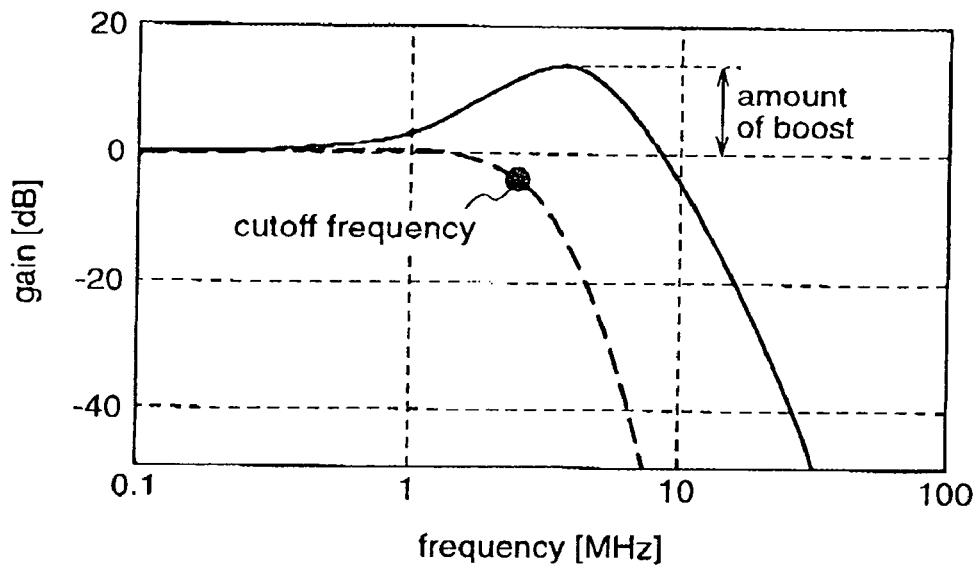
FIG. 13 is a diagram for explaining the frequency characteristics of a high order ripple filter.

A playback signal amplitude adjustment circuit 80 adjusts the amplitude of the playback RF signal 87, and it is constituted by a gain-variable VGA or the like. An equalizer 81 performs waveform adjustment of the output signal of the playback signal amplitude adjustment circuit 80, and it is constituted by a filter which can arbitrarily set the boost and the cutoff frequency. This filter may be, for example, a high order ripple filter having frequency characteristics as shown by a full line in FIG. 13. In FIG. 13, frequency characteristics in the case where no high-frequency boost is carried out are shown by a dotted line.

A second analog-to-digital (AD) converter 82 converts an analog signal into a digital RF signal 88 which is a multiple-bit digital signal at the timing of the sampling clock 23 generated by the clock generation circuit 22.

A gain learning circuit 83 automatically adjusts the gain of the playback signal amplitude adjustment circuit 80 so that a difference between an amplitude value which is obtained from a difference in signal amplitudes between the peak envelope and the bottom envelope of the digital RF signal 88, and a target amplitude value which is arbitrarily set becomes zero.

An offset canceller 84 obtains a symbolic center of the waveform of the digital RF signal 88, and corrects an offset component in the amplitude direction, which is included in the digital RF signal 88.

A data demodulation circuit 85 demodulates the digital data recorded in the optical disk medium 1, and the address information stored in the DVD-RAM disk.

A playback signal selection circuit 86 selects an output signal from among the digital RF signal 88, the digital sampling signal 24, and the output signal from the missing data interpolation circuit 40.

Hereinafter, the operation of generating a digital RF signal 88 in the optical disk device constituted as described above will be described, and next the operation of extracting and reproducing the BCA information from the digital RF signal 88 will be described.

Initially, the operation of generating the digital playback RF signal 88 will be described.

A laser beam emitted from the laser generation circuit 4 of the optical pickup 3 is reflected at the optical disk medium 1, and the reflected light beam is received by the two-split photodetectors 6a and 61b. The two-splitting photodetectors 6a and 6b output detected currents according to the amounts of received light in the respective areas, and the detected currents are converted into voltage values by the I/V converters 77 and 78 and outputted to the playback signal detection circuit 79.

The playback signal detection circuit 19 receives the outputs of the adders 11 and 12 and the outputs of the I/V converters 77 and 78, and fully adds these signals to generate a playback RF signal 87.

The playback RF signal 87 is inputted to the playback signal amplitude adjustment circuit 80, and adjusted so as to have an amplitude suited to the dynamic range of the second AD converter 82. The playback signal amplitude adjustment circuit 80 varies the gain according to a gain adjustment value which is learned by the gain learning circuit 83 to adjust the amplitude of the playback RF signal 87. Further, the gain learning circuit 83 automatically adjusts the gain of the playback signal amplitude adjustment circuit 80 so that a difference between the amplitude value which is obtained from a difference in signal amplitudes between the peak envelope and the bottom envelope of the digital RF signal 88, and a target amplitude value which is arbitrarily set, becomes zero.

The amplitude-adjusted playback RF signal 87 is corrected so as to emphasize the high frequency band, and noise components existing in frequency bands other than the demodulated signal, are removed, and thereafter, the playback RF signal 87 is inputted to the second AD converter 82.

The seconds AD Converter 82 converts the playback RF signal 87 as an analog signal into a digital RF signal 88 as a multiple-bit digital signal, at the timing of the sampling clock 23 generated by the clock generation circuit 22. The detail of the clock generation circuit 22 will be described later.

The output signal of the second AD converter 82 is subjected to correction of an offset component in the amplitude direction by the offset canceller 84, thereby generating a digital RF signal 88 in which the offset component in the amplitude direction is removed.

The operations of the clock generation circuit 22 and the offset canceller 84 will be described in detail.

Figure 15:
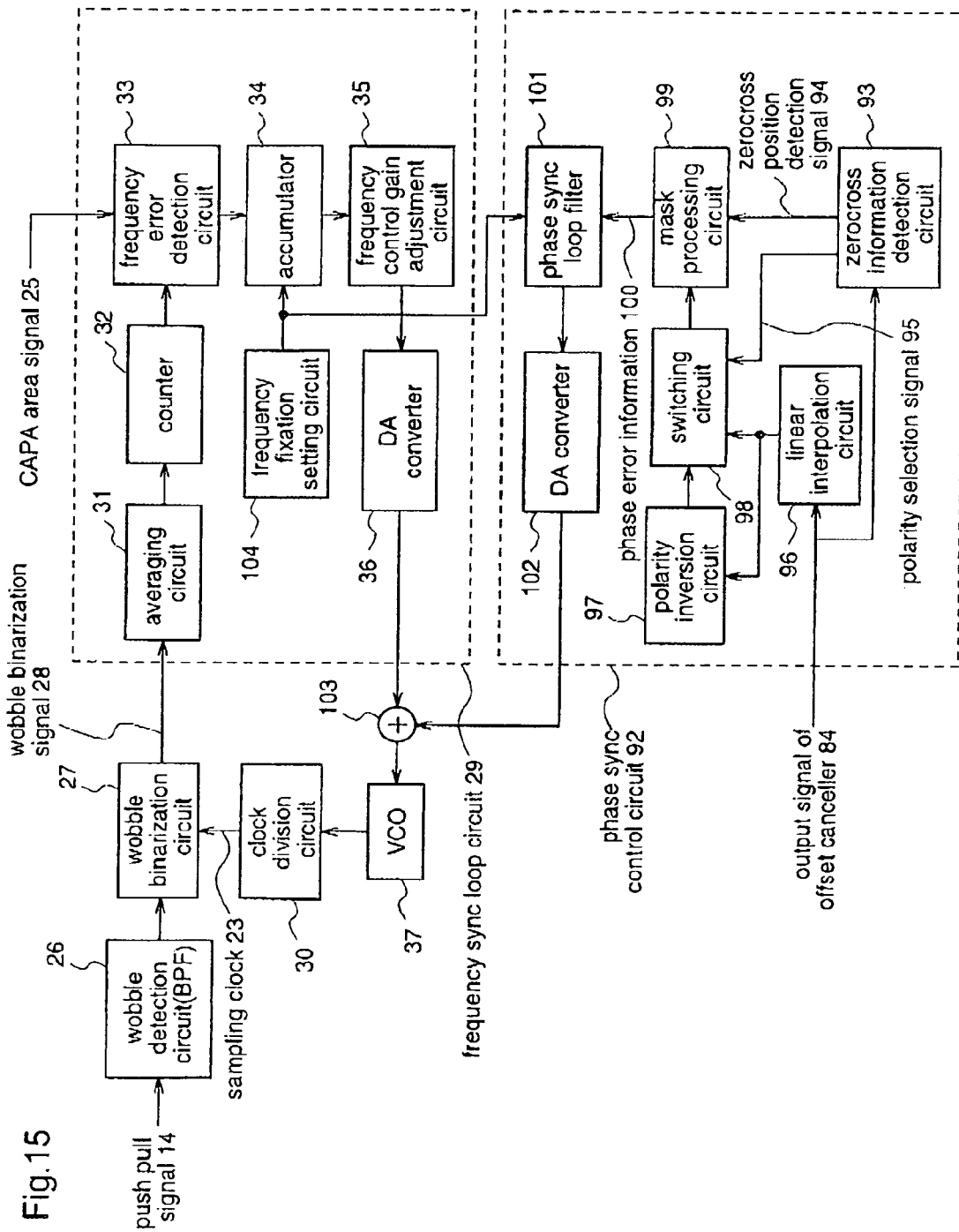
FIG. 15 is a block diagram illustrating the construction of a clock generation circuit according to the third embodiment.

Initially, the clock generation circuit 22 will be described. FIG. 15 is a block diagram illustrating the construction of the clock generation circuit 22 according to the third embodiment.

With reference to FIG. 15, a wobble detection circuit 26, a wobble binarization circuit 27, a clock division circuit 30, and a VCO 37 are identical to those of the clock generation circuit 22 of the first embodiment. Further, a frequency sync loop circuit 29 is identical to the frequency sync loop circuit 29 of the clock generation circuit 22 of the first embodiment except that it includes a frequency fixation setting circuit 104 for outputting a control value signal so as to generate a sampling clock 23 of a cycle that is calculated or estimated from the number of rotations controlled by the optical recording medium rotation control circuit 2.

A phase sync control circuit 92 performs, control so that the phase of the sampling clock 23 is synchronized with the phase of the clock component of the digital data recorded on the optical disk medium 1. The phase sync control circuit 92 includes a zerocross information detection circuit 93 for detecting a zerocross position of the output signal of the offset canceller 84 or the digital RF Signal 88, and further, generating a polarity selection signal indicating whether the position is a rising edge or a falling edge; a linear interpolation circuit 96 for interpolating the output signal of the offset canceller 84; a polarity inversion circuit 97 for inverting the polarity of the output signal of the linear interpolation circuit 96; a switching circuit 98 for selectively outputting the output signal of the polarity inversion circuit 97 and the output signal of the linear interpolation circuit 96; a mask processing circuit 99 for outputting the output signal of the switching circuit 98 as phase error information 100 at a predetermined timing on the basis of the polarity selection signal outputted from the zerocross information detection circuit 93; a phase sync loop filter 101 for performing filtering of the phase error information 100; and a digital-to-analog (DA) converter 102 for converting a digital phase control signal outputted from the phase sync loop filter 101 into an analog control signal. An addition circuit 103 adds the output signals of the DA converter 36 and the DA converter 102.

Figure 16:
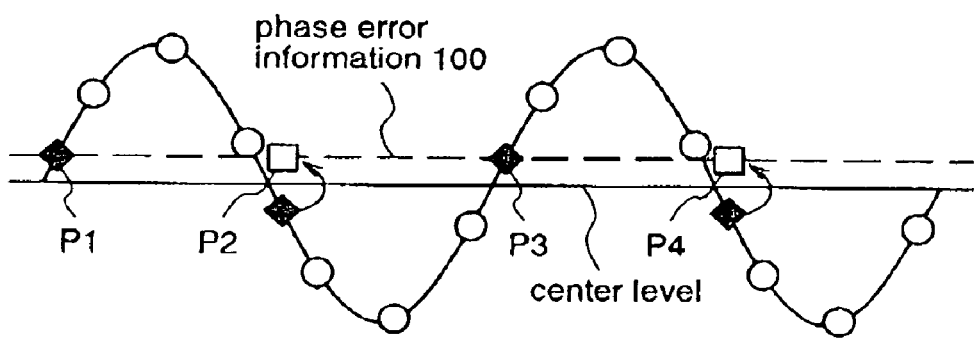
FIG. 16 is a diagram illustrating a principle of detecting phase error information by the clock generation circuit according to the third embodiment.

Next, the operation will be described. FIG. 16 is a diagram for explaining the operation of the clock generation circuit 22, and it shows an output signal of the offset canceller 84, an output signal of the linear interpolation circuit 96, and an output signal of the polarity inversion circuit 97.

Initially, the output signal of the offset canceller 84 shown by white circles (○) in FIG. 16 is inputted to the zerocross information detection circuit 93, thereby generating a zerocross position detection signal 94 indicating zerocross positions, and a polarity selection signal 95 indicating whether each zerocross position is a rising edge or a falling edge. Further, the output signal of the offset canceller 84 is inputted to the linear interpolation circuit 96, and thereafter, the adjacent white circles (○) are linearly interpolated to be converted into an intermediate signal shown by black squares (◆) in FIG. 16. This signal becomes a reference signal of a phase error signal.

The polarity inversion circuit 97 inverts the polarity of the output signal of the linear interpolation circuit 96, and outputs a signal shown by white squares (□) in FIG. 16 to the switching circuit 98. When the polarity selection signal 95 outputted from the zerocross information detection circuit 93 indicates "negative", the switching circuit 98 selects the signal outputted from the polarity inversion circuit 97 and outputs it to the mask processing circuit 99. On the other hand, when the polarity selection signal 95 indicates "positive", the switching circuit 98 selects the output signal of the linear interpolation circuit 96, and outputs it to the mask processing circuit 99.

The mask processing circuit 99 outputs the output signal of the switching circuit 98 as phase error information 100 only when a zerocross position is detected, i.e., only when the polarity is inverted, on the basis of the zerocross position detection signal 94. At this time, the phase error information 100 may be outputted after being maintained not only in the instance when the polarity changes but also until the next zerocross position. The phase error information 100 thus obtained is shown by "P1", "P2", "P3", and "P4" in FIG. 16. The selection circuit 98 selects the output signal of the polarity inversion circuit 97 at the "P2" and "P4" corresponding to the falling edge shown by the white square (□).

The phase error information 100 detected by the above-mentioned operation it subjected to filter processing by the phase sync loop filter 101, and thereafter, converted into an analog control signal by the DA converter 102.

The output signal of the DA converter 102 and the output signal of the DA converter 36 on the frequency control side, which is described for the first embodiment, are inputted to the addition circuit 103 to be added. The VCO 37 oscillates a clock with reference to the output voltage of the addition circuit 103. The output clock of the VCO 37 is converted into a sampling clock 23 through the clock division circuit 30, thereby generating a sampling clock 23 whose frequency and phase are synchronized with those of the clock component of the digital data recorded on the optical disk medium 1.

The phase sync loop filter 101 of the clock generation circuit 22 may be constituted such that it adjusts the gains of the proportional component and integral component and mixes them to perform integration. When adopting this constitution, it becomes possible to perform feedback control so as to make the phase error information 100 zero using a main control loop comprising the second AD converter 82, the offset canceller 84, the phase sync control circuit 92, the addition circuit 103, the VCO 37, the clock division circuit 30, and the second AD converter 82, thereby generating a digital RF signal synchronized with the phase of the clock component of the channel bit frequency of the playback RF signal 87.

Further, with respect to a disk capable of detecting a wobble signal component, represented by a DVD-RAM disk, a DVD-R disk, and a DVD-RW disk, it is possible to apply frequency sync control by reference to a wobble signal component and phase sync control by reference to recorded digital data, to control of the oscillation frequency of the sampling clock 23. Under the phase sync control state, the frequency sync control may be halted. Further, when no digital data is recorded, the oscillation frequency of the sampling clock 23 may be controlled by only the frequency sync control. On the other hand, where no wobble signal component exists, it is desired to perform control on the basis of the phase sync control.

Furthermore, since no reference for the sampling clock 23 exists during reproduction of BCA information described later, the output values of the accumulator 34 and the phase sync loop filter 101 may be fixed by the control value outputted from the frequency fixation setting circuit 104 shown in FIG. 15 so as to generate a sampling clock 23 of a cycle that is calculated or estimated from the number of rotations controlled by the optical recording medium rotation control circuit 2. By adopting such construction, even when there exist no wobble signal component and no clock component of recorded digital data, a sampling clock corresponding to the channel bit frequency of the digital data recorded on the optical recording medium can be generated on the basis of the number of rotations of the optical recording medium. Therefore, it becomes unnecessary to change the multiplier of the digital signal processing circuit according to the reproduction speed, whereby detection of high-speed BCA pulse is stabilized. Further, when the above-mentioned circuit is implemented by a semiconductor integrated circuit, the construction thereof can be simplified and the circuit scale thereof can be reduced.

Next, the operation of the offset canceller 84 will be described.

Figure 14:
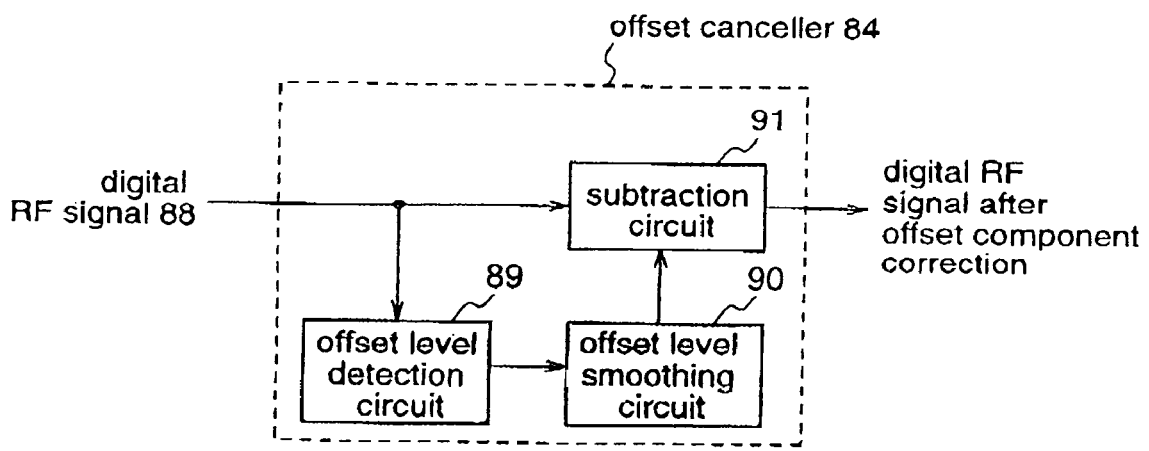
FIG. 14 is a block diagram illustrating the construction of an offset canceller according to the third embodiment.

The offset canceller 84 is composed of an offset level detection circuit 89, an offset level smoothing circuit 90, and a subtraction circuit 91 as shown in FIG. 14.

The offset level detection circuit 89 outputs the phase information in the case where a zerocross position is detected, according to the inputted digital RF signal 88, as center level variation information. On the other hand, "+A" is added when the polarity of the digital RF signal 88 is "positive" with reference to the zero level, while "−A" is added when it is "negative" (A: arbitrary integer), and these data are accumulated. This accumulation signal is information expressing the balance of the symbolic polarity of the output signal from the offset canceller 84, and offset information from the symbolic center level is extracted on the basis of the accumulation information. Then, the center level variation information and the information indicating the balance of the symbolic polarity are added at an arbitrary ratio, thereby generating offset level information.

The offset level information is smoothed by the offset level smoothing circuit 90, and outputted to the subtraction circuit 91. In the subtraction circuit 91, the smoothed offset level information in the amplitude direction is subtracted from the digital RF signal 88, thereby generating a digital RF signal 88 in which the offset component in the amplitude direction which is included in the digital RF signal 88 is corrected.

Next, the operation of extracting BCA information from the digital RF signal 88 and reproducing the BCA information will be described.

The positive/negative polarity of the digital RF signal 88 inputted to the reproduction signal selection circuit 86 is inverted by a reproduction signal polarity inversion circuit (not shown) included in the reproduction signal selection circuit 86, resulting in an inversion signal of the reproduction RF signal 87 as shown in FIG. 17(c). Since reproduction of the BCA information and reproduction of the address information and the digital data recorded on the optical disk medium 1 are not necessarily carried out simultaneously, the reproduction signal selection circuit 86 outputs the digital RF signal 88 to the zone peak detection circuit 38 and to the zone bottom detection circuit 39 during the reproduction of the BCA information, and outputs the digital sampling signal 24 and the output signal of the missing data interpolation circuit 40 to the zone peak detection circuit 38 and the zone bottom detection circuit 39 during normal recording/reproduction other than reproduction of the BCA information. The inversion signal of the reproduction RF signal 87 is inputted to the zone peak detection circuit 38 and then inputted to the first high-pass noise removal circuit 43.

A peak envelope signal 44 outputted from the first high-pass noise removal circuit 43 is a signal indicated by a full line in FIG. 17(d), and it is inputted to the first low-pass variation component extraction circuit 45 and thereafter converted into a signal from which a low-pass variation component is extracted, as shown by a dotted line in FIG. 17(d). An arbitrary offset level is added to the output signal of the first low-pass variation component extraction circuit 45 by the first threshold detection circuit 46, whereby the signal is converted into a signal having a threshold level as shown by a dotted line in FIG. 17(e). The peak envelope signal 44 shown by the full line in FIG. 17(e) and the output signal of the first threshold detection circuit 46, which is shown by the dotted line in FIG. 17(e), are inputted to the signal polarity determination circuit 47 to be compared with each other, thereby generating a BCA pulse signal 106 as shown in FIG. 17(f). In the detected BCA pulse signals 106, the section of "1" indicates the dark side while the section of "0" indicates the bright side, and the optical disk controller 16 demodulates the BCA information on the basis of the BCA pulse signal 106.

Figure 18:
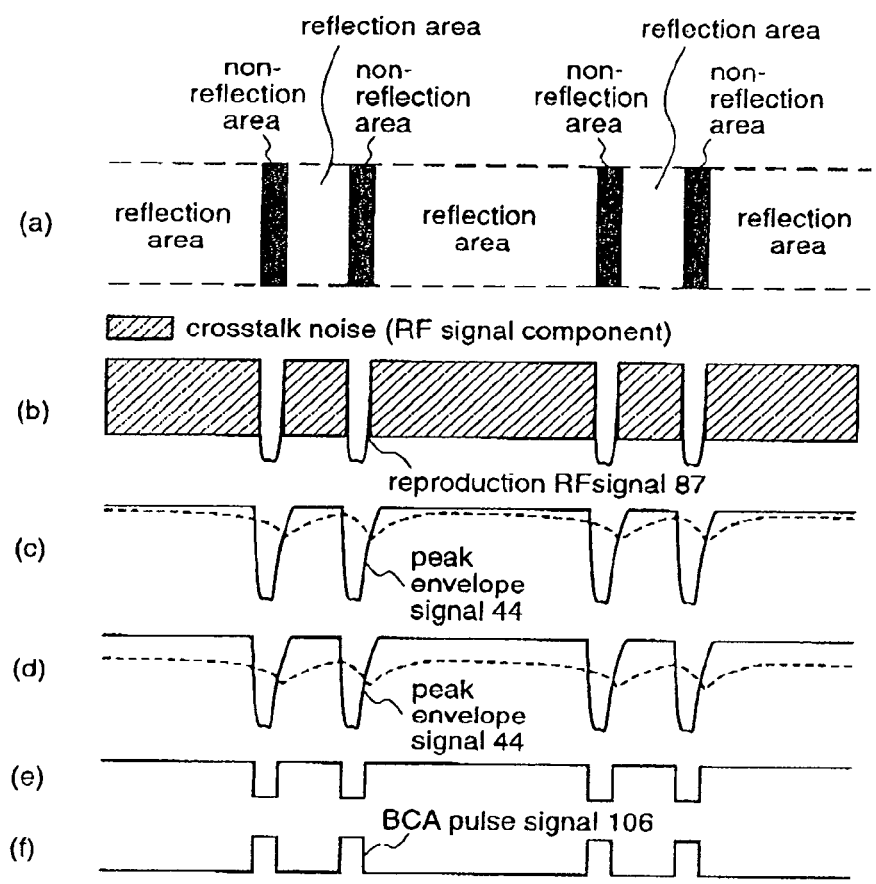
FIG. 18 is a diagram for explaining a principle of generating a BCA pulse signal from a read-only optical disk according to the third embodiment.

The BCA information in the read-only optical medium 1 as represented by a DVD-ROM disk is detected as a reproduction RF signal 87 shown in FIG. 18(b) by the optical pickup 3. In FIG. 18(b), the upper side is the bright side with a lot of reflected light while the lower side is the dark side with less reflected light. The hatched region means that an RF signal component leaks into the region due to crosstalk noise or the like. In contrast to the above-mentioned recordable disk, since digital data have already been stored in the read-only disk 1, the amount of leakage of the RF signal component is increased.

Therefore, it is possible to realize an optical disk device capable of appropriately detecting RCA information on the read-only optical disk medium 1, by constituting the reproduction signal selection circuit 86 and the signal polarity determination circuit 47 according to the third embodiment as described hereinafter.

That is, the digital RF signal 88 including the BCA information, which is outputted from the first AD converter 20, is inputted to the reproduction signal selection circuit 86, and thereafter, the signal 88 is inputted to the zone peak detection circuit 38 with the polarity as it is. The output signal of the zone peak detection circuit 38 is inputted to the first high-pass noise removal circuit 43, and then it is inputted to the first low-pass variation component extraction circuit 45 as a peak envelope signal 44 as shown by a full line in FIG. 18(c). The peak envelope signal 44 is converted into a signal from which a low-pass variation is extracted, as shown by a dotted line in FIG. 18(c), by the first low-pass variation component extraction circuit 45. An arbitrary offset level is added to the output signal of the first low-pass variation component extraction circuit 45 by the first threshold detection circuit 46, thereby converting the signal so as to have a threshold level shown by a dotted line in FIG. 18(d).

The peak envelope signal 44 shown by the full line in FIG. 18(d) and the output signal of the first threshold detection circuit 46 shown by the dotted line in FIG. 10(d) are inputted to the signal polarity determination circuit 47 to be compared with each other. Immediately after the comparison by the signal polarity determination circuit 47, a signal shown in FIG. 18(e) is obtained. However, it is possible to generate a BCA pulse signal 106 shown in FIG. 18(f) by providing the signal polarity determination circuit 47 with a polarity signal inversion circuit (not shown) for inverting "1" and "0" of the digital signal.

As described above, according to the third embodiment, the reproduction RF signal 87 is converted into the digital RF signal 88 by the second AD converter 82, and thereafter, the BCA information is reproduced from the digital RF signal 88 by the address polarity information detection circuit 48. Therefore, a special circuit for extracting the BCA information can be dispensed with, thereby realizing reductions in the circuit scale and cost of the optical disk device.

Further, according to the third embodiment, when detecting the BCA information recorded on the recordable optical recording medium 1, the cutoff frequency in the first high-pass noise removal circuit 43 can be set in accordance with the characteristics of the BCA signal component included in the reproduction RF signal 87. Therefore, even with the width of the cutting area in which the amount of reflected light from the photodetector decreases is narrow, the BCA information can be detected with stability.

Furthermore, the reproduction signal selection circuit 86 is provided with the reproduction signal polarity inversion circuit for inverting the negative/positive polarity of the output signal thereof, and the signal polarity determination circuit 47 is provided with the polarity signal inversion circuit for inverting the polarity of the binarized signal outputted therefrom. Therefore, detection of the BCA information recorded on the writable optical recording medium and detection of the BCA information recorded on the read-only optical recording medium can be carried out according to the respective characteristics thereof. Therefore, even when the recording quality of the BCA information is degraded due to such as great crosstalk noise of the reproduction RF signal, the BCA information can be detected with stability.

Furthermore, the sampling clock 23 that is synchronized with the phase of the clock component of the digital data recorded on the optical recording medium 1 is generated, and the digital signal processing circuit is driven with the sampling clock, resulting in highly accurate address detection.

APPLICABILITY IN INDUSTRY

An optical disk device according to the present invention can detect address information at high speed immediately after seeking even when the quality of a signal read from an optical recording medium is low, and further, it can stably perform signal reproduction from an optical recording medium on which BCA information exists. Therefore, the optical disk device is useful as a recording/reproduction DVD-RAM drive, a DVD recorder, and a recording/reproduction apparatus for an optical disk on which BCA information exists.

What is claimed is:

1. An optical disk device comprising:
   a first photodetector for detecting a light from an optical recording medium on which address information exists intermittently in an embossed area, said first photodetector being divided into four parts by a track direction axis and a radial direction axis that is perpendicular to the track direction axis;
   an optical difference signal detection circuit for adding, among outputs from said first photodetector which have been current-to-voltage converted, the outputs corresponding to areas parallel to the track direction axis, and detecting a difference between the respective added values;
   an amplitude adjustment circuit for adjusting the amplitude of an output signal of said optical difference signal detection circuit;
   a clock generation circuit for generating, from the output signal of the optical difference signal detection circuit, a sampling clock having a frequency that is synchronized with digital data recorded on the optical recording medium;
   a first analog-to-digital converter for converting an output signal of said amplitude adjustment circuit into a digital sampling signal according to the sampling clock;
   an address polarity information detection circuit for detecting a peak envelope signal from the digital sampling signal, and comparing the peak envelope signal with a predetermined threshold value to detect address polarity information, wherein said address polarity information detection circuit comprises
      a zone peak detection circuit for detecting an amount of peak in an arbitrary zone, from the digital sampling signal,
      a first high-pass noise removal circuit for removing a high-pass noise component from an output signal of said zone peak detection circuit to detect the peak envelope signal,
      a first low-pass variation component extraction circuit for extracting a low-pass variation component from an output signal of said first high-pass noise removal circuit,
      a first threshold detection circuit for adding an arbitrary offset level to an output signal of said first low-pass variation component extraction circuit, and
      a signal polarity determination circuit for comparing the output signal of said first high-pass noise removal circuit with the output signal of said first threshold detection circuit to generate the address polarity information, said signal polarity determination circuit includes a spike removal circuit for removing spike pulses that deteriorate continuity of the address polarity information, and a polarity signal mask circuit for enabling the address polarity information in a position where presence of the address information is estimated; and an address position information detection circuit for detecting a bottom envelope signal from the digital sampling signal, detecting signal amplitude information from a difference in amplitudes between the peak envelope signal and the bottom envelope signal, and comparing the signal amplitude information with a predetermined threshold value, thereby detecting address position information, wherein said address position information detection circuit comprises a zone bottom detection circuit for detecting the amount of bottom in an arbitrary zone, from the digital sampling signal, a second high-pass noise removal circuit for removing a high-pass noise component from an output signal of said zone bottom detection circuit to detect the bottom envelope signal, a second low-pass variation component extraction circuit for extracting a low-pass variation component from an output signal of said second high-pass noise removal circuit, a signal amplitude detection circuit for detecting the signal amplitude information from a difference between the output signal of said first high-pass noise removal circuit and the output signal of said second high-pass noise removal circuit, an amplitude low-pass variation detection circuit for extracting the amplitude low-pass variation component information from a difference between the output signal of said first low-pass variation component extraction circuit and the output signal of said second low-pass variation component extraction circuit, a second threshold detection circuit for adding an arbitrary offset level to an output signal of said amplitude low-pass variation detection circuit, and an address position detection circuit for comparing the output signal of said signal amplitude detection circuit with the output signal of said second threshold detection circuit to generate the address position information, said address position detection circuit includes a spike removal circuit for removing spike pulses that deteriorate continuity of the address position information, and an address position information mask circuit for enabling the address position information in a position where presence of the address information is estimated.

2. An optical disk device as defined in claim 1 wherein said clock generation circuit comprises:

a wobble detection circuit for detecting a wobble pattern that is carved in tracks on the optical recording medium to obtain a wobble signal;

a wobble binarization circuit for converting the wobble signal into binarized data;

a frequency sync loop circuit for performing control so that the sampling clock is synchronized with a frequency corresponding to a channel bit of digital data recorded on the optical recording medium, or an arbitrary frequency that is N times (N: positive integer) as high as the frequency corresponding to the channel bit of the digital data;

a voltage-controlled oscillator for varying a clock to be output, according to an output signal of said frequency sync loop circuit; and a clock division circuit for arbitrarily dividing the clock outputted from said voltage-controlled oscillator into M (M: positive integer), wherein said frequency sync loop circuit controls the clock outputted from said voltage-controlled oscillator so that the clock is synchronized with the frequency corresponding to the channel bit of the digital data recorded on the optical recording medium, or the arbitrary frequency that is N times (N: positive integer) as high as the frequency corresponding to the channel bit of the digital data, on the basis of the cycle of the output signal from said wobble binarization circuit.

3. An optical disk device as defined in claim 1 further including a missing data interpolation circuit for interpolating the digital sampling signal, wherein said zone peak detection circuit compares the sampling signal with an output signal of said missing data interpolation circuit to detect the amount of peak in an arbitrary zone, and said zone bottom detection circuit compares the sampling signal with the output signal of said missing data interpolation circuit to detect the amount of bottom in an arbitrary zone.

4. An optical disk device as defined in claim 1 wherein said second low-pass variation component extraction circuit extracts a low-pass variation component from the output signal of said signal amplitude detection circuit, and said second threshold value detection circuit adds an arbitrary offset level to the output signal of said second low-pass variation component extraction circuit.

5. An optical disk device as defined in claim 4 further comprising:

an offset variation detection circuit for detecting center points of the output signal from said first high-pass noise removal circuit and the output signal from said high-pass noise removal circuit;

said first low-pass variation component extraction circuit receiving the output signal of said offset variation detection circuit instead of the output signal of said signal amplitude detection circuit;

a first envelope detection circuit for detecting an absolute value of a difference between the output signal of said first low-pass variation component extraction circuit and the output signal of said first high-pass noise removal circuit;

a second envelope detection circuit for detecting an absolute value of a difference between the output signal of said first low-pass variation component extraction circuit and the output signal of said second high-pass noise removal circuit; and an addition circuit for adding the output signal of said first envelope detection circuit and the output signal of said second envelope detection circuit, wherein said second low-pass variation component extraction circuit extracts a low-pass variation component from the output signal of said addition circuit instead of the output signal of said signal amplitude detection circuit.

6. An optical disk device as defined in claim 1 further comprising:

an optical recording medium rotation control circuit for controlling rotation of the optical recording medium;

a laser generation circuit for irradiating the optical recording medium with laser light;

an optical pickup having a first photodetector and a second photodetector;

an optical pickup drive circuit for controlling the operation of said optical pickup;

a high-pass removal filter for removing a high-pass component from the output signal of said optical difference signal detection circuit to obtain a tracking error signal; and an optical disk controller for controlling said optical recording medium rotation control circuit and said optical pickup drive circuit, using the tracking error signal, the address polarity information, the address position information, and the sampling clock.

7. An optical disk device comprising:

a first photodetector for detecting a light signal from an optical recording medium on which address information exists intermittently in an embossed area or an optical recording medium on which a burst cutting area wherein information of the recording medium is described, said first photodetector being divided into four parts by a track direction axis and a radial direction axis that is perpendicular to the track direction axis;

an optical difference signal detection circuit for adding, among outputs of said first photodetector which have been current-to-voltage converted, the outputs corresponding to areas parallel to the track direction axis, and detecting a difference between the respective added values;

an amplitude adjustment circuit for adjusting the amplitude of an output signal of said optical difference signal detection circuit;

a clock generation circuit for generating, from the output signal of said optical difference signal detection circuit, a sampling clock having a frequency that is synchronized with digital data recorded on the optical recording medium;

a first analog-to-digital converter for converting an output signal of said amplitude adjustment circuit into a digital sampling signal according to the sampling clock;

a second photodetector for detecting a focus error signal;

a reproduction signal detection circuit for detecting a reproduction radio frequency signal using, among the outputs from said first photodetector which have been current-to-voltage converted, the outputs corresponding to the areas parallel to the track direction axis which have been added, and the output from said second photodetector which has been current-to-voltage converted;

a reproduction signal amplitude adjustment circuit for performing amplitude adjustment of the output signal from said reproduction signal detection circuit;

an equalizer for emphasizing a high-pass component of the output signal from said reproduction signal amplitude adjustment circuit;

a second analog-to-digital converter for converting the output signal of said equalizer into a digital radio frequency signal according to the sampling clock generated from said clock generation circuit;

a reproduction signal selection circuit for selecting one of the digital sampling signals outputted from said first analog-to-digital converter and the digital radio frequency signal;

an address polarity information detection circuit for detecting a peak envelope signal from the output signal of said reproduction signal selection circuit, and comparing the peak envelope signal with a predetermined threshold value, thereby detecting address polarity information, or burst cutting area information recorded in the burst cutting area, wherein said address polarity information detection circuit comprises a zone peak detection circuit for detecting the amount of peak in an arbitrary zone, from the output of said reproduction signal selection circuit, a first high-pass noise removal circuit for removing a high-pass noise component from the output signal of said zone peak detection circuit to detect the peak envelope signal, a first low-pass variation component extraction circuit for extracting a low-pass variation component from an output signal of said first high-pass noise removal circuit, a first threshold detection circuit for adding an arbitrary offset level to an output signal of said first low-pass variation component extraction circuit, and a signal polarity determination circuit for comparing the output signal of said first high-pass noise removal circuit with the output signal of said first threshold detection circuit to generate the address polarity information, said signal polarity determination circuit includes a spike removal circuit for removing spike pulses that deteriorate continuity of the address polarity information, and a polarity signal mask circuit for enabling the address polarity information at a position where presence of the address information is estimated; and an address position information detection circuit for detecting a bottom envelope signal from the output signal of said reproduction signal selection circuit, detecting signal amplitude information from a difference in amplitudes between the peak envelope signal and the bottom envelope signal, and comparing the signal amplitude information with a predetermined threshold value to detect address position information, wherein said address position information detection circuit comprises a zone bottom detection circuit for detecting the amount of bottom in an arbitrary zone, from the output signal of said reproduction signal selection circuit, a second high-pass noise removal circuit for removing a high-pass noise component from an output signal of said zone bottom detection circuit to detect the bottom envelope signal, a second low-pass variation component extraction circuit for extracting a low-pass variation component from an output signal of said second high-pass noise removal circuit, a signal amplitude detection circuit for detecting the signal amplitude information from a difference between the output signal of the first high-pass noise removal circuit and the output signal of said second high-pass noise removal circuit, an amplitude low-pass variation detection circuit for extracting the amplitude low-pass variation component information from a difference between the output signal of said first low-pass variation component extraction circuit and the output signal of said second low-pass variation component extraction circuit, a second threshold detection circuit for adding an arbitrary offset level to an output signal of said amplitude low-pass variation detection circuit, and an address position detection circuit for comparing the output signal of said signal amplitude detection circuit with the output signal of said second threshold detection circuit to generate the address position information, said address position detection circuit includes a spike removal circuit for removing spike pulses that deteriorate continuity of the address position information, and an address position information mask circuit for enabling the address position information at a position where presence of the address information is estimated.

8. An optical disk device as defined in claim 7 wherein said clock generation circuit comprises:
a wobble detection circuit for detecting a wobble pattern that is carved in tracks formed on the optical recording medium to obtain a wobble signal;
a wobble binarization circuit for converting an output of said wobble detection circuit into binarized data;
a frequency sync loop circuit for performing control so that the sampling clock is synchronized with a frequency corresponding to a channel bit of the digital data recorded on the optical recording medium, or an arbitrary frequency that is N times (N: positive integer) as high as the frequency corresponding to the channel bit of the digital data;
a voltage-controlled oscillator for varying a clock to be output, according to an output signal of said frequency sync loop circuit; and
a clock division circuit for arbitrarily dividing the clock outputted from said voltage-controlled oscillator into M (M: positive integer);
wherein said frequency sync loop circuit controls the clock outputted from said voltage-controlled oscillator so that the clock is synchronized with the frequency corresponding to the channel bit of the digital data recorded on the optical recording medium, or the arbitrary frequency that is N times (N: positive integer) as high as the frequency corresponding to the channel bit of the digital data, on the basis of the cycle of the output signal from the wobble binarization circuit.

9. An optical disk device as defined in claim 7 wherein said address polarity information detection circuit detects address polarity information when said reproduction signal selection circuit selects the digital sampling signal, and
detects the burst cutting area information when said reproduction signal selection circuit selects the digital radio frequency signal.

10. An optical disk device as defined in claim 7 further comprising a missing data interpolation circuit for interpolating the digital sampling signal, wherein: said zone peak detection circuit compares the sampling signal with an output signal of said missing data interpolation circuit to detect the amount of peak in an arbitrary zone, and said zone bottom detection circuit compares the sampling signal with the output signal of said missing data interpolation circuit to detect the amount of bottom in an arbitrary zone.

11. An optical disk device as defined in claim 7 wherein: said second low-pass variation component extraction circuit extracts a low-pass variation component from the output signal of said signal amplitude detection circuit; and said second threshold value detection circuit adds an arbitrary offset level to the output signal of said second low-pass variation component extraction circuit.

12. An optical disk device as defined in claim 7 wherein: said reproduction signal selection circuit is provided with a reproduction signal polarity inversion circuit for inverting the positive/negative polarity of an output signal thereof; and said signal polarity determination circuit is provided with a polarity signal inversion circuit for inverting the polarity of a binarized signal as an output signal thereof.

13. An optical disk device as defined in claim 12 wherein when detecting the burst cutting area information from a writable optical recording medium, said reproduction signal polarity inversion circuit inverts and outputs the digital radio frequency signal so that a dark side of reflected light of a light spot becomes an upper side of the output signal of said reproduction signal selection circuit.

14. An optical disk device as defined in claim 12 wherein when detecting the burst cutting area information from a read-only optical recording medium, said reproduction signal polarity inversion circuit outputs the digital radio frequency signal without inverting the radio frequency signal so that a bright side of reflected light of the light spot becomes an upper side of the output signal of said reproduction signal selection circuit.

15. An optical disk device as defined in claim 8 wherein said clock generation circuit has a frequency fixation setting circuit for generating a clock in the vicinity of a channel bit frequency which is calculated from a number of rotations controlled by said optical recording medium rotation circuit.

16. An optical disk device as defined in claim 15 wherein
said clock generation circuit further comprises a phase sync control circuit for extracting phase error information from the digital radio frequency signal, and synchronizing the sampling clock with a phase of a clock component included in the digital data recorded on the optical recording medium, and
controls the clock to be outputted from said voltage-controlled oscillator according to the output signal of said frequency sync loop circuit and the output signal of said phase sync control circuit.

17. An optical disk device as defined in claim 7 further comprising a gain learning circuit for setting a gain for adaptively performing amplitude adjustment of said reproduction signal amplitude adjustment circuit, on the basis of the digital radio frequency signal.

18. An optical disk device as defined in claim 17 wherein said gain learning circuit adjusts the gain of said reproduction signal amplitude address so as to cause a difference between an amplitude value which is obtained from an amplitude difference between the peak envelope and the bottom envelope of the digital radio frequency signal, and a target amplitude which is arbitrarily set, to be zero.

19. An optical disk device as defined in claim 7 further comprising:
an offset cancel circuit for extracting an offset in the amplitude direction from the digital radio frequency signal, and deleting the offset from the digital radio frequency signal to output the digital radio frequency signal; and
a data demodulation circuit for binarizing the signal outputted from said offset cancel circuit.

* * * * *